(12) United States Patent
Schaaf et al.

(10) Patent No.: US 9,555,578 B2
(45) Date of Patent: Jan. 31, 2017

(54) TRANSFER SYSTEM AND METHOD FOR APPLYING A FILM MATERIAL TO AN ELONGATE MEMBER

(71) Applicant: The Boeing Company, Chicago, IL (US)

(72) Inventors: America O. Schaaf, Seattle, WA (US); Richard A. Miller, Auburn, WA (US)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 13/970,818

(22) Filed: Aug. 20, 2013

(65) Prior Publication Data

US 2014/0290822 A1    Oct. 2, 2014

Related U.S. Application Data

(63) Continuation-in-part of application No. 13/690,809, filed on Nov. 30, 2012, now Pat. No. 9,067,374.

(51) Int. Cl.
| | |
|---|---|
| *B29C 65/02* | (2006.01) |
| *B29C 63/02* | (2006.01) |
| *B64C 1/06* | (2006.01) |
| *B29L 31/00* | (2006.01) |

(52) U.S. Cl.
CPC ............ *B29C 63/024* (2013.01); *B29C 65/02* (2013.01); *B29C 2793/00* (2013.01); *B29L 2031/003* (2013.01); *B64C 1/064* (2013.01); *Y10T 156/10* (2015.01); *Y10T 156/1052* (2015.01); *Y10T 156/1085* (2015.01); *Y10T 156/1087* (2015.01); *Y10T 156/17* (2015.01)

(58) Field of Classification Search
CPC .... B29C 63/024; B29C 65/02; B29C 65/1412; B29C 66/80; B29C 2793/00; B29C 2793/0027; B29C 2793/0063; B29C 1/064; B29C 65/4818; B29C 65/481; B29C 65/4805; B29C 65/48; B29C 65/486; B29L 2031/003; Y10T 56/1052; Y10T 56/1085; Y10T 56/1087; B64C 1/064
USPC ........................................ 156/475, 486, 468
See application file for complete search history.

(56) References Cited

U.S. PATENT DOCUMENTS

| | | | |
|---|---|---|---|
| 4,475,976 A | 10/1984 | Mittelstadt et al. | |
| 5,454,776 A * | 10/1995 | Ulrich ....................... | B31B 3/00 493/117 |
| 5,782,064 A * | 7/1998 | Beeman .................... | B65B 7/20 53/377.2 |
| 6,986,827 B2 | 1/2006 | Matsui et al. | |

(Continued)

FOREIGN PATENT DOCUMENTS

| | | |
|---|---|---|
| CN | 104418025 A | 3/2015 |
| DE | 21 18 570 A1 | 10/1972 |

OTHER PUBLICATIONS

Extended European Search Report, EP 14 18 0801 (2015).
Examination Report, Canadian Intellectual Property Office, CA 2,857,523 (Oct. 16, 2015).

*Primary Examiner* — Linda L Gray
(74) *Attorney, Agent, or Firm* — Walters & Wasylyna LLC

(57) ABSTRACT

A transfer system including a frame having an upper end portion and a lower end portion, a transfer fixture connected to the upper end portion, the transfer fixture defining a channel and including an elongate transfer member positioned in the channel, the elongate transfer member including a web and a base flange connected to the web.

24 Claims, 38 Drawing Sheets

(56) References Cited

U.S. PATENT DOCUMENTS

| | | |
|---|---|---|
| 7,686,915 B1 | 3/2010 | McAnally |
| 9,073,279 B2 * | 7/2015 | Pettersson ................. B31B 1/60 |
| 2008/0302915 A1 | 12/2008 | Yip et al. |
| 2009/0064636 A1 * | 3/2009 | Chu .............................. 53/136.4 |
| 2010/0012268 A1 | 1/2010 | Nobis et al. |
| 2012/0285020 A1 | 11/2012 | Brown |
| 2013/0014903 A1 | 1/2013 | Johnson |
| 2013/0333845 A1 * | 12/2013 | Brown .......................... 156/486 |

* cited by examiner

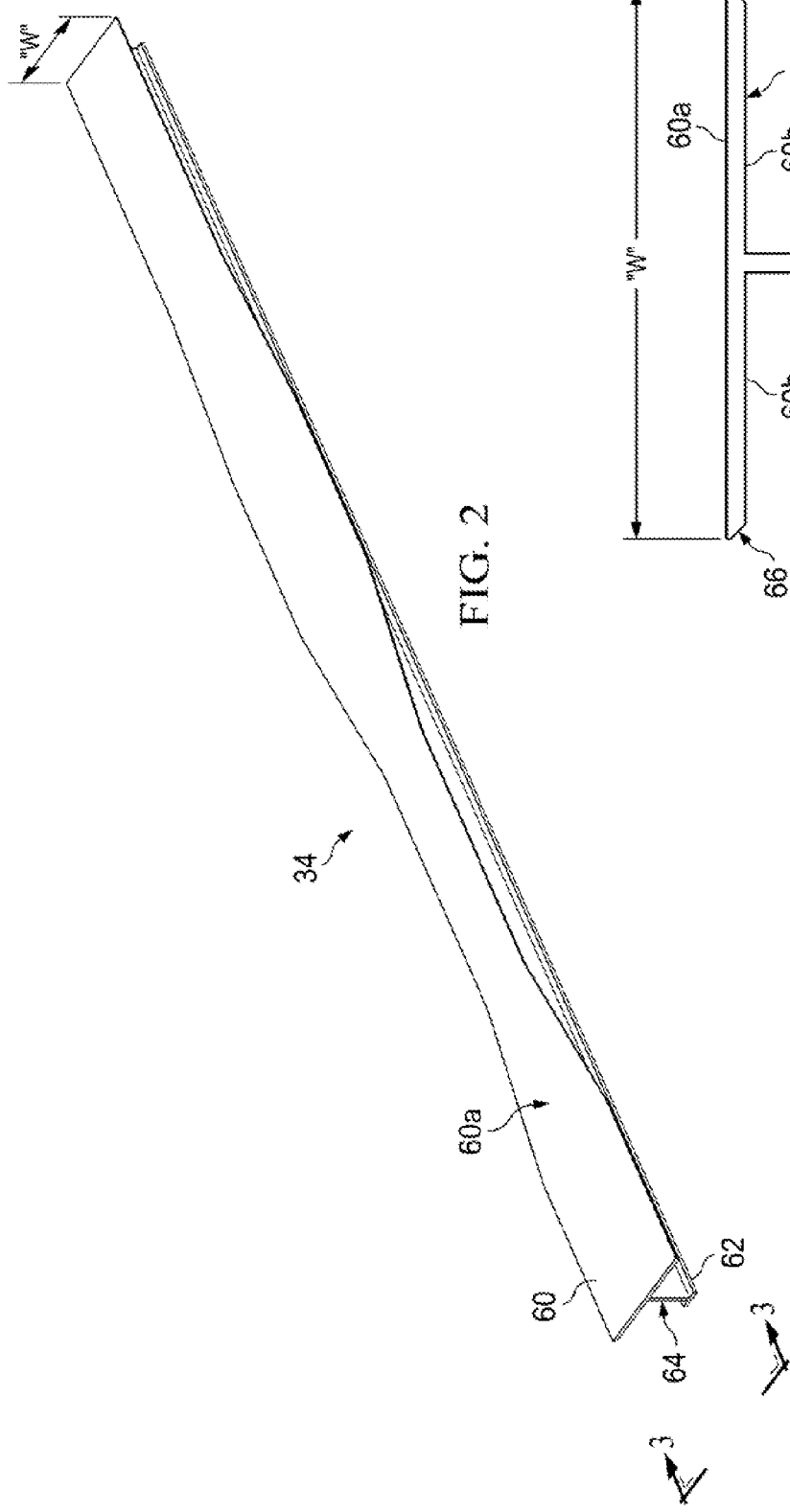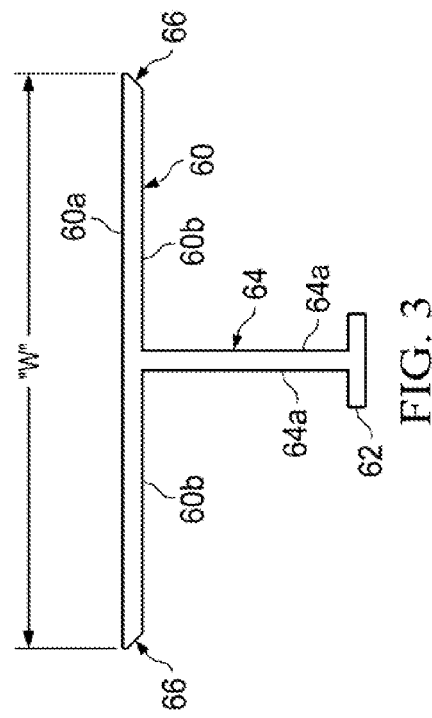

TRANSFER SYSTEM AND METHOD FOR APPLYING A FILM MATERIAL TO AN ELONGATE MEMBER

PRIORITY

This application is a continuation-in-part of U.S. Ser. No. 13/690,809 filed on Nov. 30, 2012.

FIELD

This application relates to apparatus and methods for applying a film material to an elongate member (e.g., a stringer) and, more particularly, to apparatus and methods for holding a film applicator relative to an elongate member and transferring the film application from elongate member to elongate member.

BACKGROUND

In the aircraft industry, elongate members, such as composite stringers, must be held in a desired position while being prepared for an adhesive bonding operation. During preparation for bonding, a film adhesive material is manually rolled out to the length of the stringer, which may be 90 feet or more, and a protective poly backer must then be removed from the film. The entire length of the film material is then flipped over by a team of workers in order to place the backside of the film adhesive on a base flange of the stringer. Workers then manually trim excess film material away from the edges of the base flange.

During the operations described above, the stringer may be hand held by several workers, while other workers roll out and apply the film adhesive to the stringer. The stringer may also be hand-held while workers trim away excess film adhesive. Hand holding and manipulation of the stringer may be tedious, time-consuming, labor intensive and may present the risk of damage to edges of the base flange.

Once the film application process is complete for one stringer, work may begin on another stringer. The process of transitioning work from one stringer to the next may be difficult and time consuming, particularly when heavy equipment is involved.

Accordingly, those skilled in the art continue with research and development efforts in the field of film material application.

SUMMARY

In one embodiment, the disclosed transfer system may include a frame having an upper end portion and a lower end portion, a transfer fixture connected to the upper end portion, the transfer fixture defining a channel and including an elongate transfer member positioned in the channel, the elongate transfer member including a web and a base flange connected to the web.

In another embodiment, the disclosed transfer system may include a frame having an upper end portion and a lower end portion, a transfer fixture connected to the upper end portion, the transfer fixture including a first beam, a second beam opposed from the first beam, the first and second beams defining a channel therebetween, and an elongate transfer member positioned in the channel, the elongate transfer member including a web and a base flange connected to the web.

In another embodiment, the disclosed transfer system may include (1) a transfer cart including a transfer fixture, the transfer fixture including a first beam, a second beam laterally opposed from the first beam, the first and second beams defining a first channel therebetween, and an elongate transfer member positioned in the first channel; (2) a holding system including a holding fixture, the holding fixture including a first beam, a second beam laterally opposed from the first beam, the first and second beams defining a second channel therebetween, and an elongate support mounted within the second channel; and (3) an elongate member received in the holding fixture and supported on the elongate support.

In another embodiment, the disclosed method for transferring a film applicator relative to an elongate member may include the steps of (1) providing an elongate transfer member; (2) positioning the elongate transfer member such that the elongate transfer member is substantially aligned with the elongate member; (3) connecting the elongate transfer member to the elongate member with a splice member; and (4) moving the film applicator across the splice member.

In yet another embodiment, the disclosed method for transferring a film applicator relative to an elongate member may include the steps of (1) providing a transfer cart that includes a transfer fixture, the transfer fixture including laterally opposed beams and an elongate transfer member positioned between the beams; (2) positioning the transfer cart such that the elongate transfer member is substantially aligned with the elongate member; (3) connecting the elongate transfer member to the elongate member with a splice member; and (4) moving the film applicator across the splice member.

Other embodiments of the disclosed transfer system and method for applying a film material to an elongate member will become apparent from the following detailed description, the accompanying drawings and the appended claims.

BRIEF DESCRIPTION OF THE DRAWINGS

FIG. 2 is a perspective view of a stringer having a base flange surface to which film material is applied using the film applicator shown in FIG. 1;

FIG. 3 is an end view of the stringer shown in FIG. 2;

DETAILED DESCRIPTION

Figure 1:
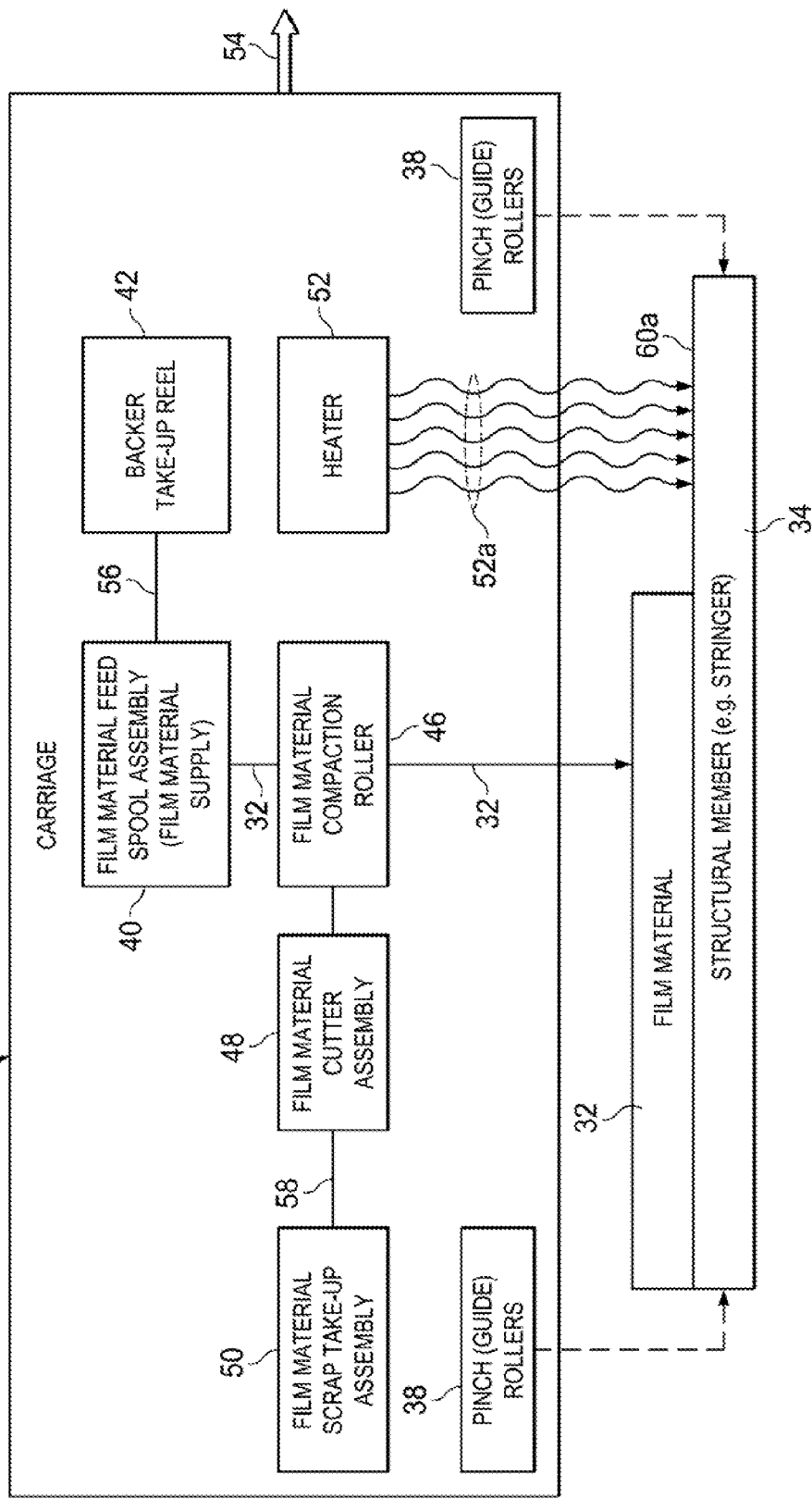
FIG. 1 is a functional block diagram of a film applicator according to an embodiment of the disclosure.
Figure 4:
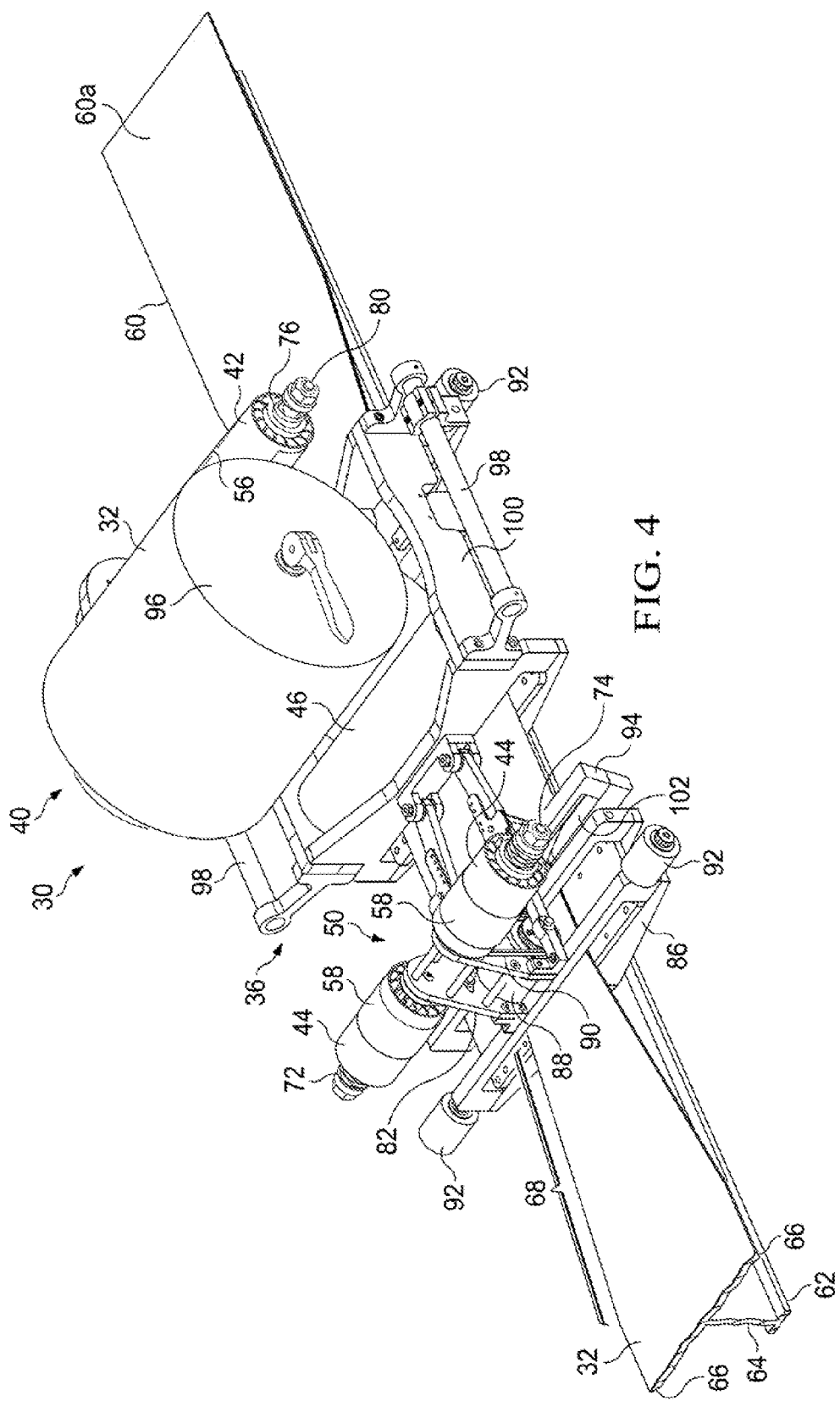
FIG. 4 is an upper perspective view showing one side of the film applicator in the process of placing film on a stringer flange.
Figure 5:
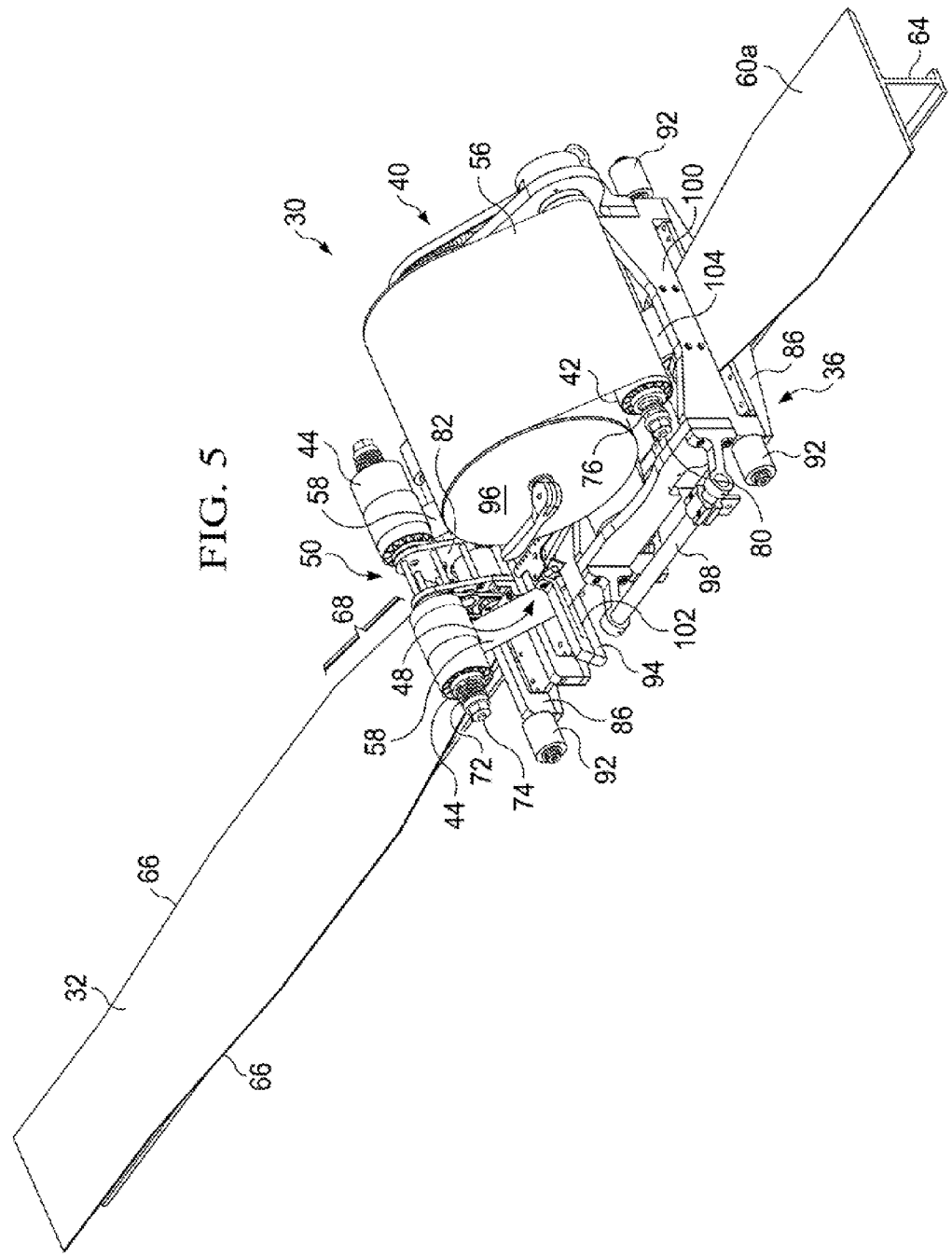
FIG. 5 is an illustration similar to FIG. 4, but showing the opposite side of the film applicator.
Figure 6:
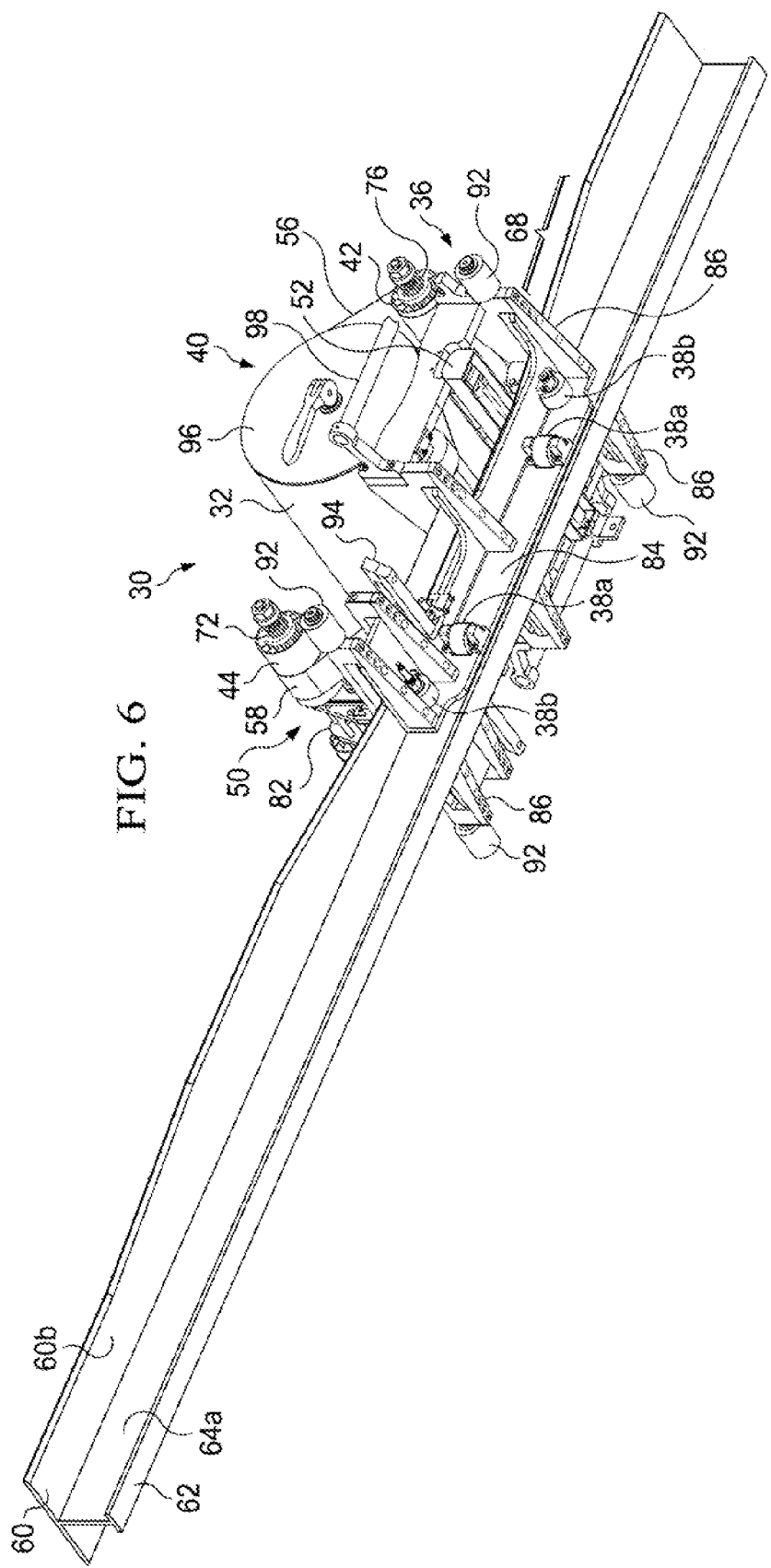
FIG. 6 is a lower perspective view showing one side of the film applicator.
Figure 7:
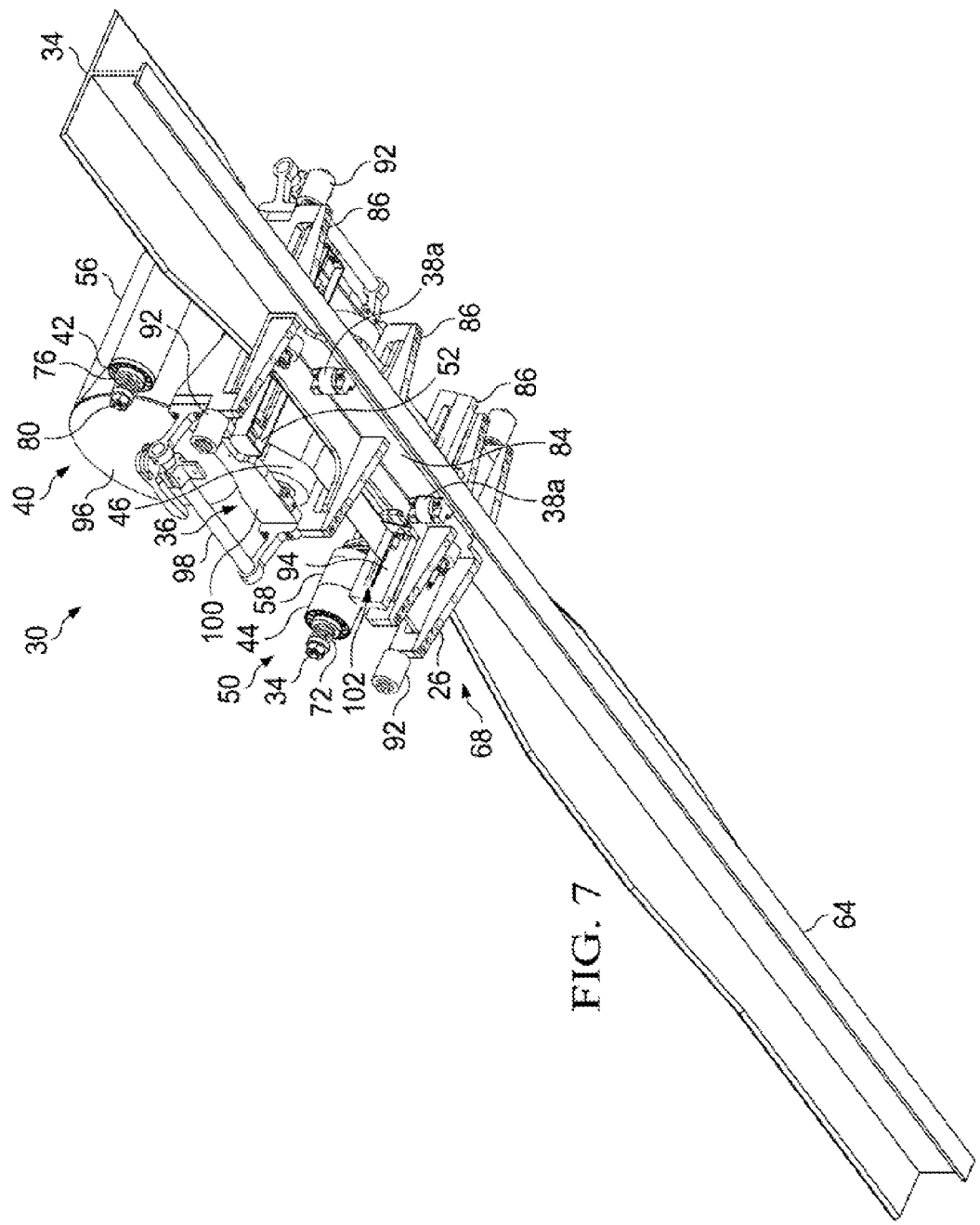
FIG. 7 is an illustration similar to FIG. 6, but showing the opposite side of the film applicator.
Figure 8:
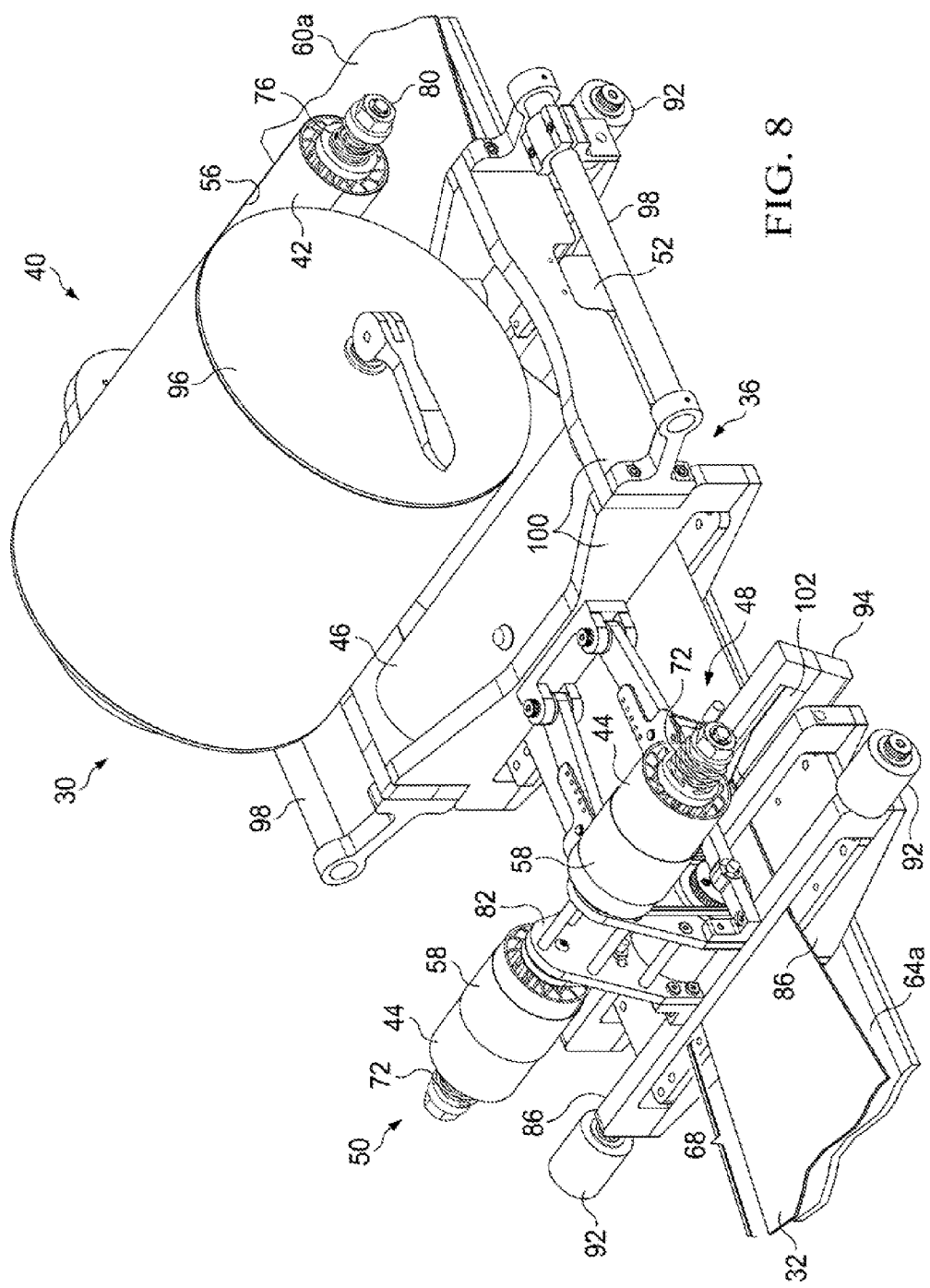
FIGS. 8-11 are illustrations similar to FIGS. 4-7, respectively, but enlarged to show additional details of the film applicator.
Figure 9:
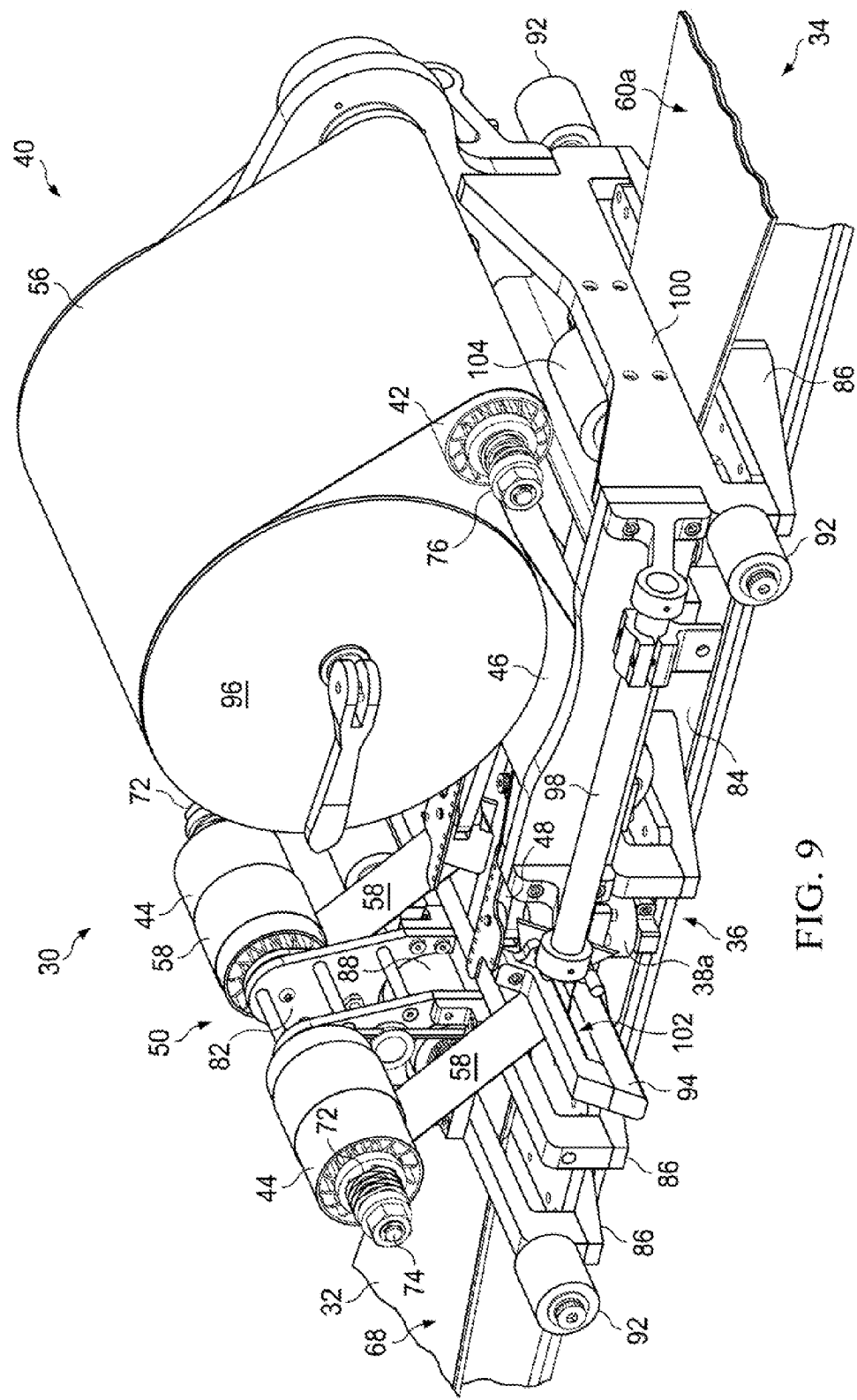
Figure 10:
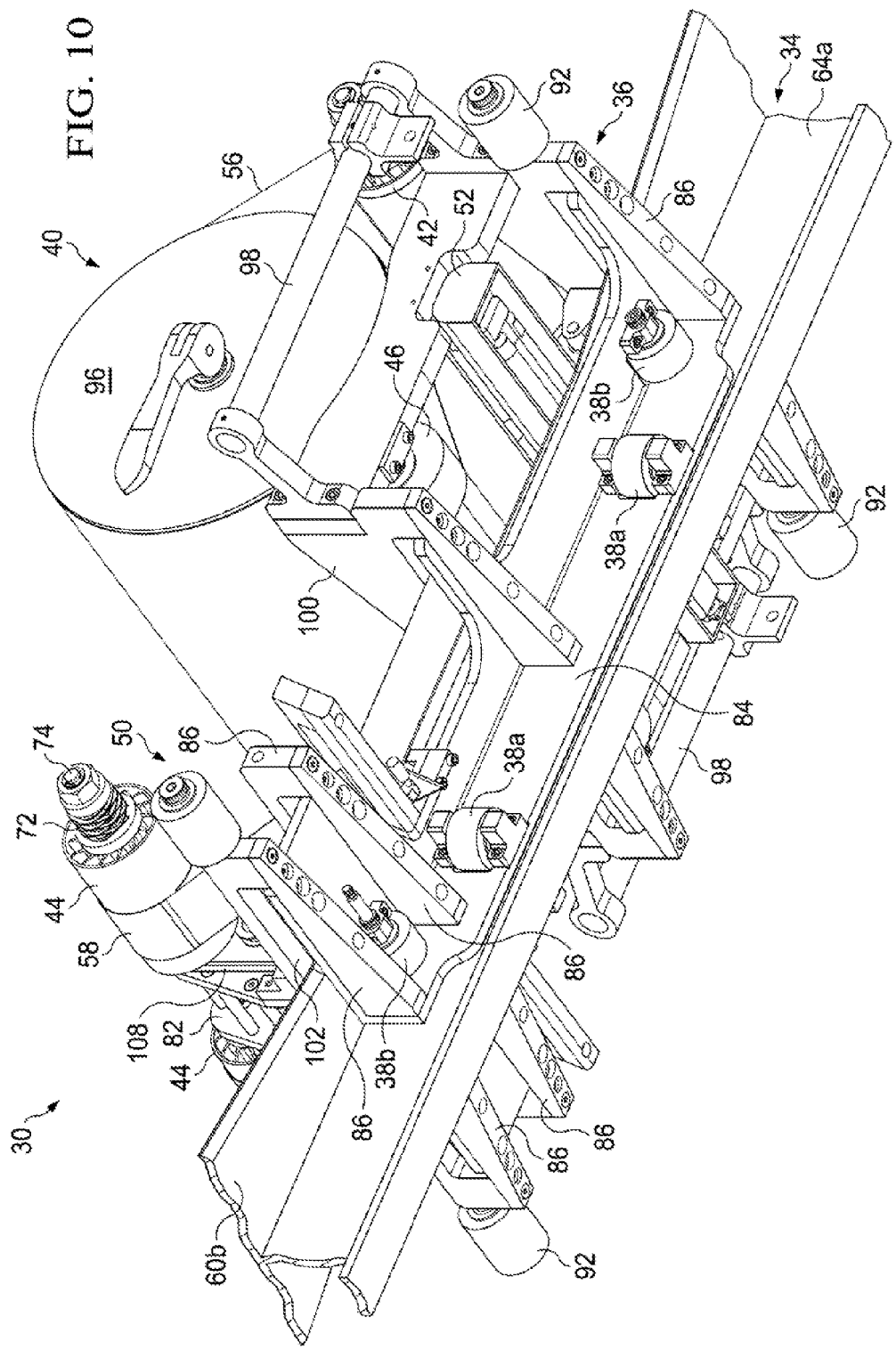
Figure 11:
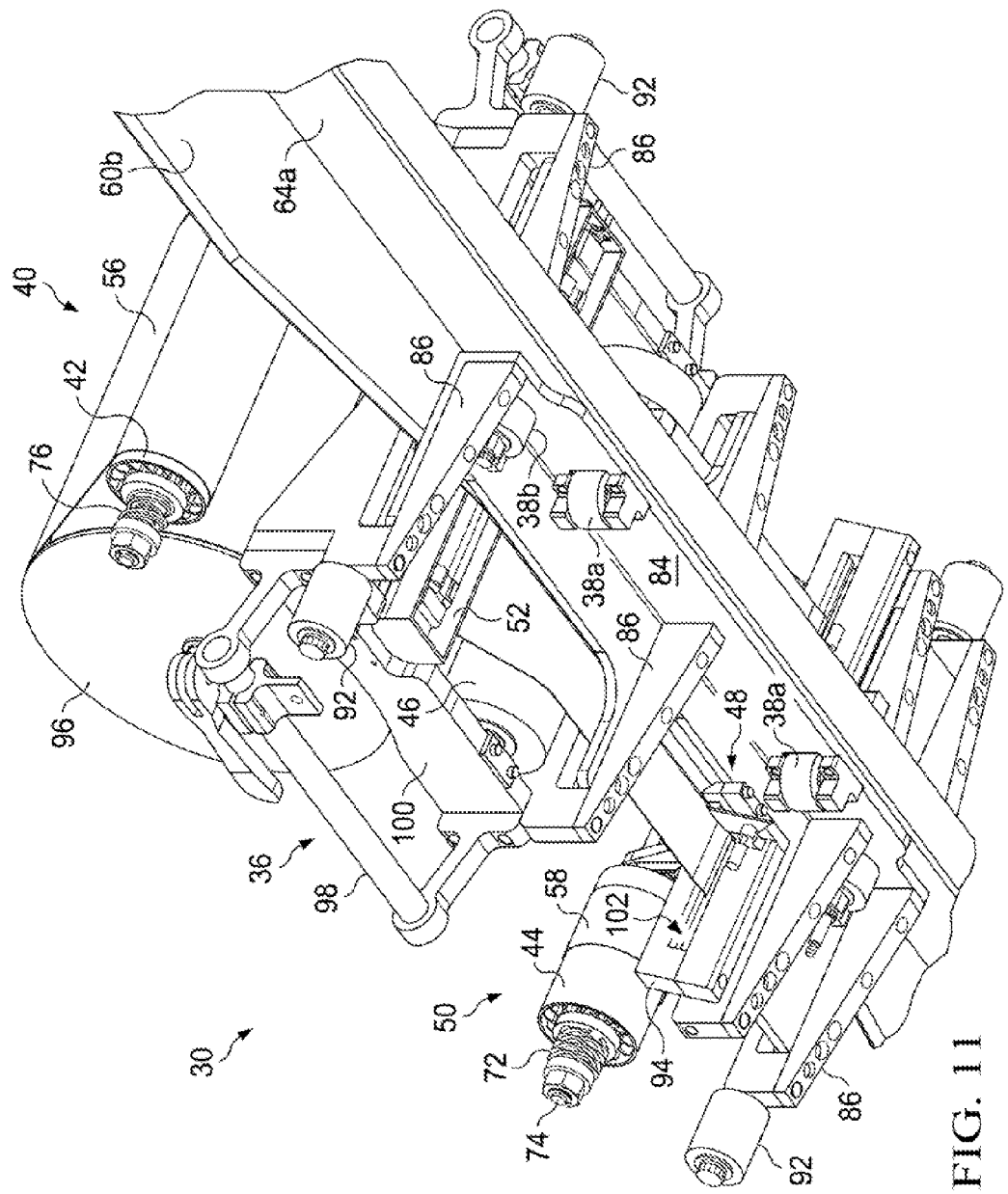
Figure 12:
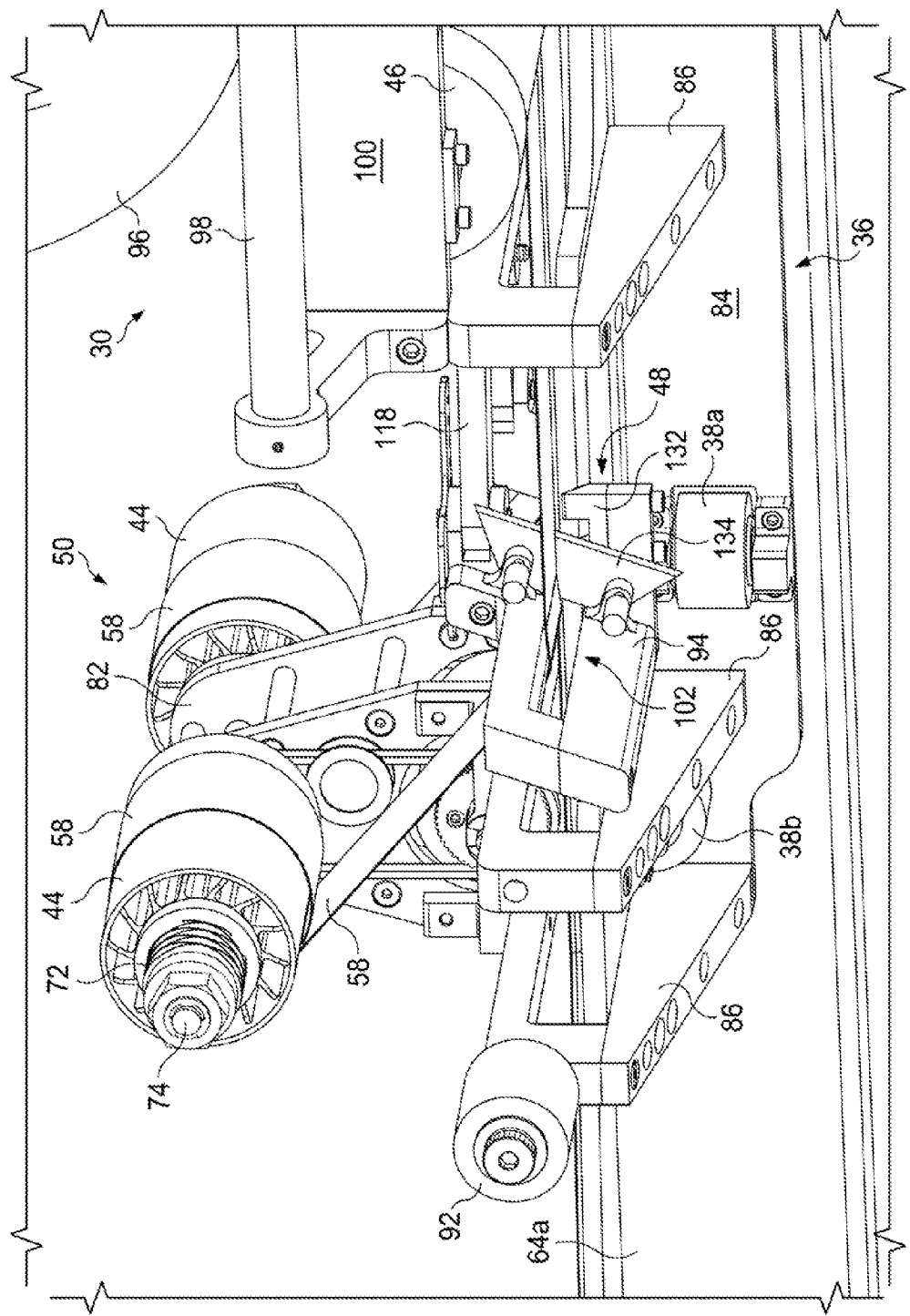
FIG. 12 is a perspective view of the rear half of the film applicator, showing details of the film cutter assembly and film scrap take-up assembly.
Figure 13:
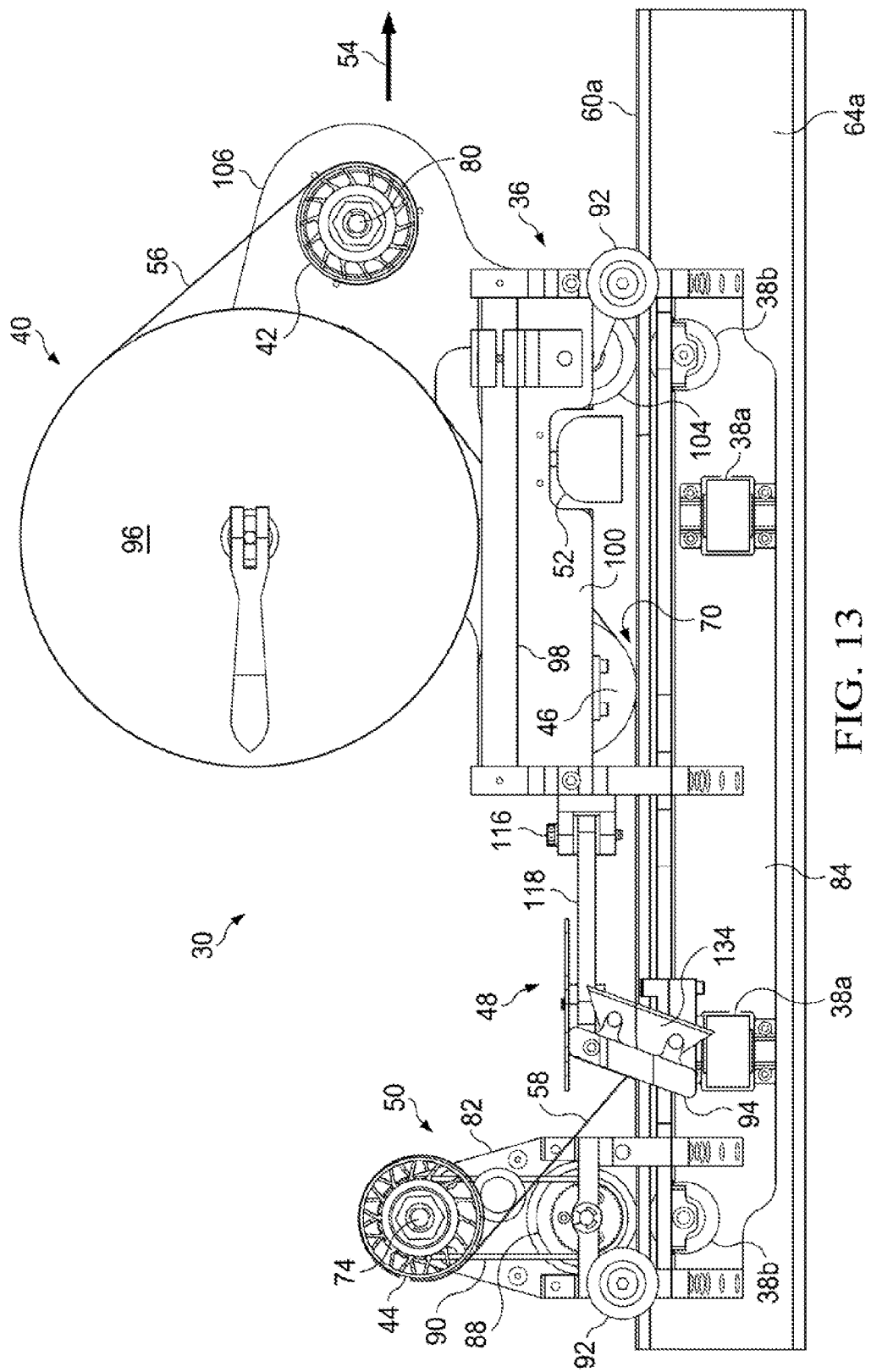
FIG. 13 is an elevational view of one side of the film applicator.

Referring to FIG. 1, disclosed is a film applicator 30 for dispensing, placing, compacting and trimming film material 32 on the surface 60a of an elongate member 34. For simplicity of description, the apparatus 30 may be referred to as a film applicator 30, and the film material 32 may be referred to as film 32, material 32 or film material 32. In the embodiment discussed below in more detail, the elongate member 34 may be a composite stringer, however it is to be understood that the film applicator 30 may be employed to apply film material 32 to the surface of any long, relatively narrow members, such as, without limitation, spars, beams, doublers, frames, stringers, support structures, etc. The film material 32 may comprise any relatively thin, flexible material that is required to be applied to the elongate member 34, such as without limitation, an adhesive.

In one particular embodiment, the disclosed film applicator 30 may include several functional components discussed below that are mounted on a carriage 36 for rolling movement along the elongate member 34 by means of pinch rollers 38. The pinch rollers 38 may engage and grip the top, bottom and sides of the elongate member 34 in order to both guide and index the film applicator 30 as the film applicator 30 is moved along the length of the elongate member 34 in the direction of travel or placement 54.

The film applicator 30 may include a film feed roll assembly 40 containing a supply of the film material 32, which may be dispensed and fed to a film compaction roller 46. The film compaction roller 46 may compact the film material 32 against the surface 60a as the carriage 36 moves along the length of the elongate member 34. Optionally, a suitable heater 52, such as an infrared heater mounted on the carriage 36, may be used to heat 52a the surface 60a immediately before the film 32 is placed and compacted in order to improve adhesion of the film material 32 to the surface 60a. As the film 32 is being dispensed, a backer 56, typically a poly film material protectively covering the film material 32, may be drawn away from the film material 32 and may be fed to a backer take-up reel 42. A film cutter assembly 48 mounted on the carriage 36 aft of the film compaction roller 46 may trim the outer edges of the film material 32 to substantially match the edges of the elongate member 34. The film scrap 58 resulting from this trimming operation may be accumulated on a film scrap take-up assembly 50, which may also be mounted on the carriage 36.

Referring now to FIGS. 2 and 3, the elongate member 34, may comprise a composite laminate stringer, which is shown in an inverted position in the drawings. The elongate member 34 may include a base flange 60 and a top flange 62 connected by a central web 64, forming a generally T-shaped cross-section (in the inverted position). The base flange 60 may include a flange surface 60a extending the entire length of the elongate member 34 and may have a width W. In the example shown in FIGS. 2 and 3, the width W may be substantially constant along the entire length of the elongate member 34. However, in other examples, the width W of the flange surface 60a may vary. Also, although the illustrated flange surface 60a is substantially flat, in other examples, the flange surface 60a may be curved, and/or twisted along its length. Opposite longitudinal edges 66 of the base flange 60 may be beveled. In order to bond the base flange 60 to another structure such as, for example and without limitation, a skin (not shown), a film adhesive may be applied over the base flange surface 60a using the film applicator 30 shown in FIG. 1 and described in more detail below.

Attention is now directed to FIGS. 4-15, which illustrate one embodiment of the film applicator 30 that may be employed to place film material 32 on the flange surface 60a of an elongate member 34. In this example, the flange surface 60a may includes an inward taper 68 (see FIGS. 4 and 5) along its opposite beveled edges 66. As shown in FIGS. 9, 10, 13 and 14, the film applicator 30 may include a carriage 36 comprising a lower frame 84 and an upper frame 100 that are fixedly attached to each other by brackets 86. Handlebars 98 on opposite sides of the upper frame 100 may be adapted to be grasped by a worker for handling and transporting the film applicator 30, and for manually moving it along the elongate member 34 during the film application process. Outrigger wheels 92 attached to the outer ends of brackets 86 may be used to support and guide the film applicator 30 along a later discussed holding system (FIGS. 25-29) that may be used to hold the elongate member 34 in a fixed, inverted position during the film placement process.

A first set of longitudinally spaced pinch rollers 38a (FIGS. 6 and 7) mounted on the lower frame 84 may engage opposite sides 64a of the web 64 (see FIG. 3), thereby laterally indexing the carriage 36 on the elongate member 34. The pinch rollers 38a may be formed of any suitable material such as, without limitation, a synthetic rubber, and may include be spring-loaded inwardly against the sides 64a of the web 64. A second set of longitudinally spaced pinch rollers 38b (see FIGS. 10 and 13) similar in construction to pinch rollers 38a, may also be mounted on the lower frame 84, and may bear upwardly against lower base flange surfaces 60b (see FIG. 3) of the base flange 60. Pinch rollers 38b may be spring-loaded upwardly against the lower base flange surfaces 60b. Pinch rollers 38b, in combination with other components discussed below, may vertically index the carriage 36 and may grip the film applicator 30 onto the elongate member 34. The pinch rollers 38a, 38b may effectively guide and allow the carriage 36 to roll along the elongate member 34.

The film feed roll assembly 40 may broadly comprise a removable feed roll 96 on which a quantity of the film material 32 may be stored. A backer take-up reel 42 may take up and accumulate a protective backer 56 on the film material 32 as the film material 32 is drawn from the film feed roll 40 assembly. The film material 32 may be fed into a nip 70 (FIGS. 13 and 14) between the compaction roller 46 and the flange surface 60a as the carriage 36 moves along the elongate member 34. Although not shown in the drawings, the film material 32 may include a second backer that may remain adhered to the film material 32 as it is compacted against the flange surface 60a.

Figure 14:
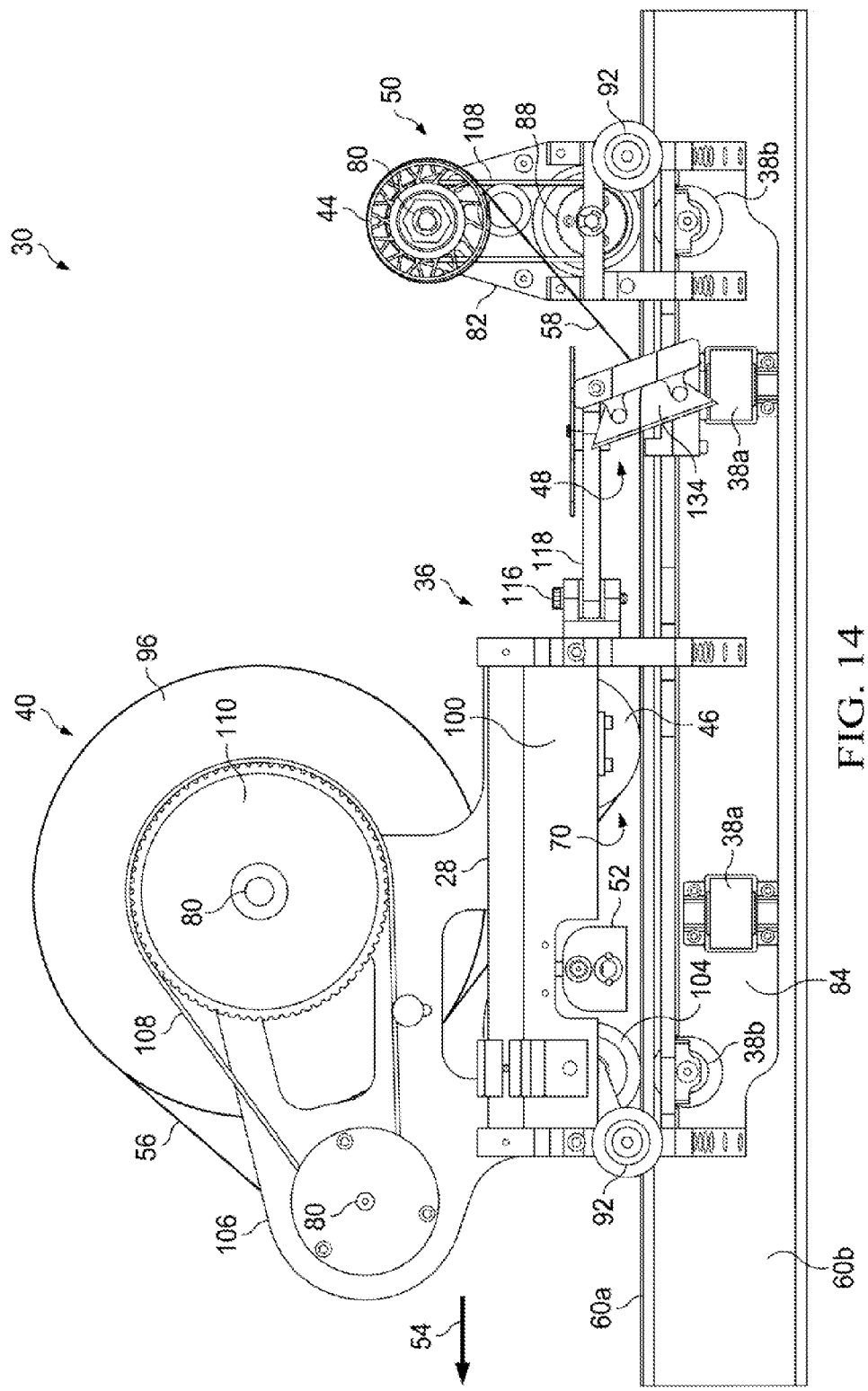
FIG. 14 is an elevational view of the other side of the film applicator.
Figure 15:
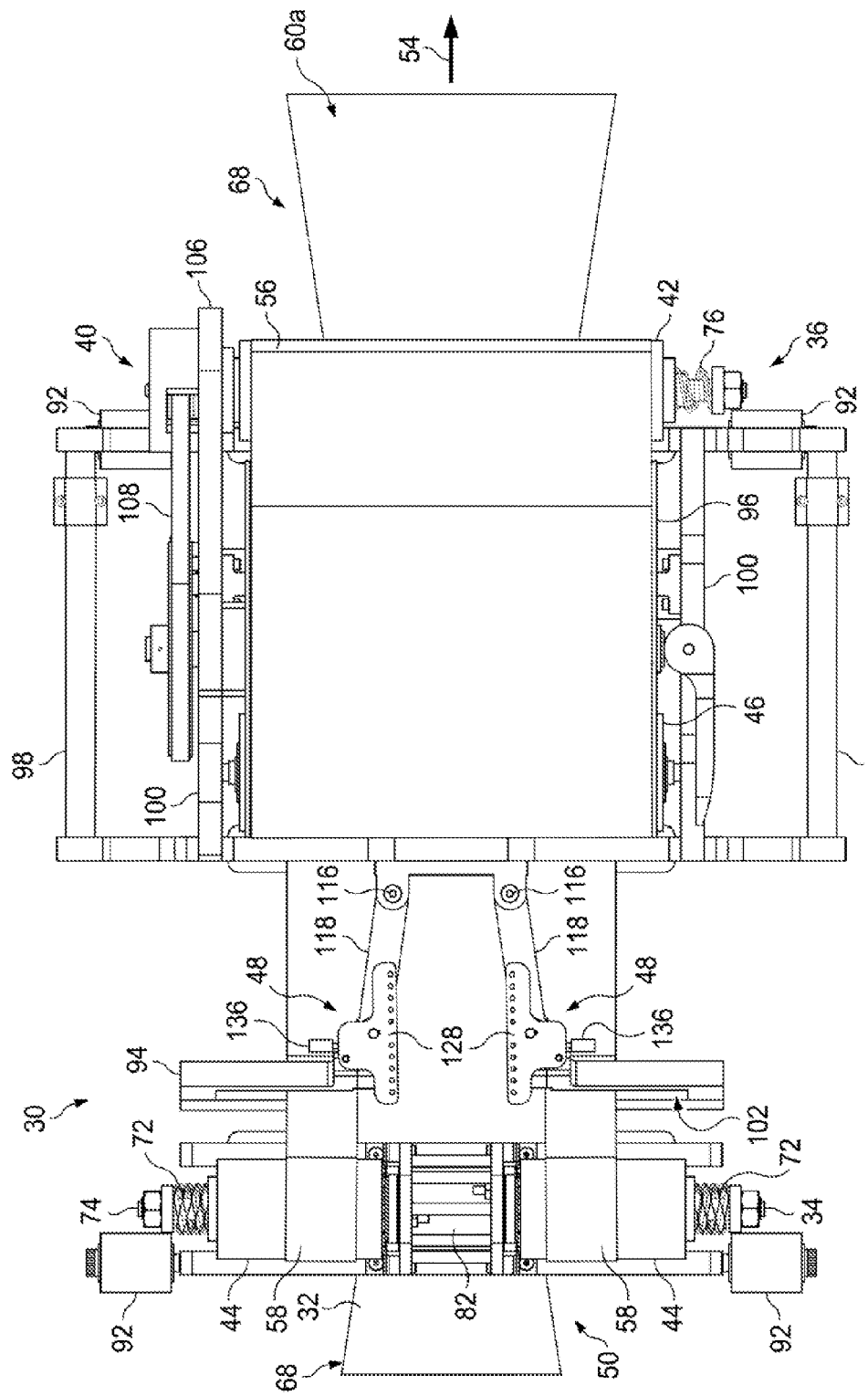
FIG. 15 is a top plan view of the film applicator.
Figure 16:
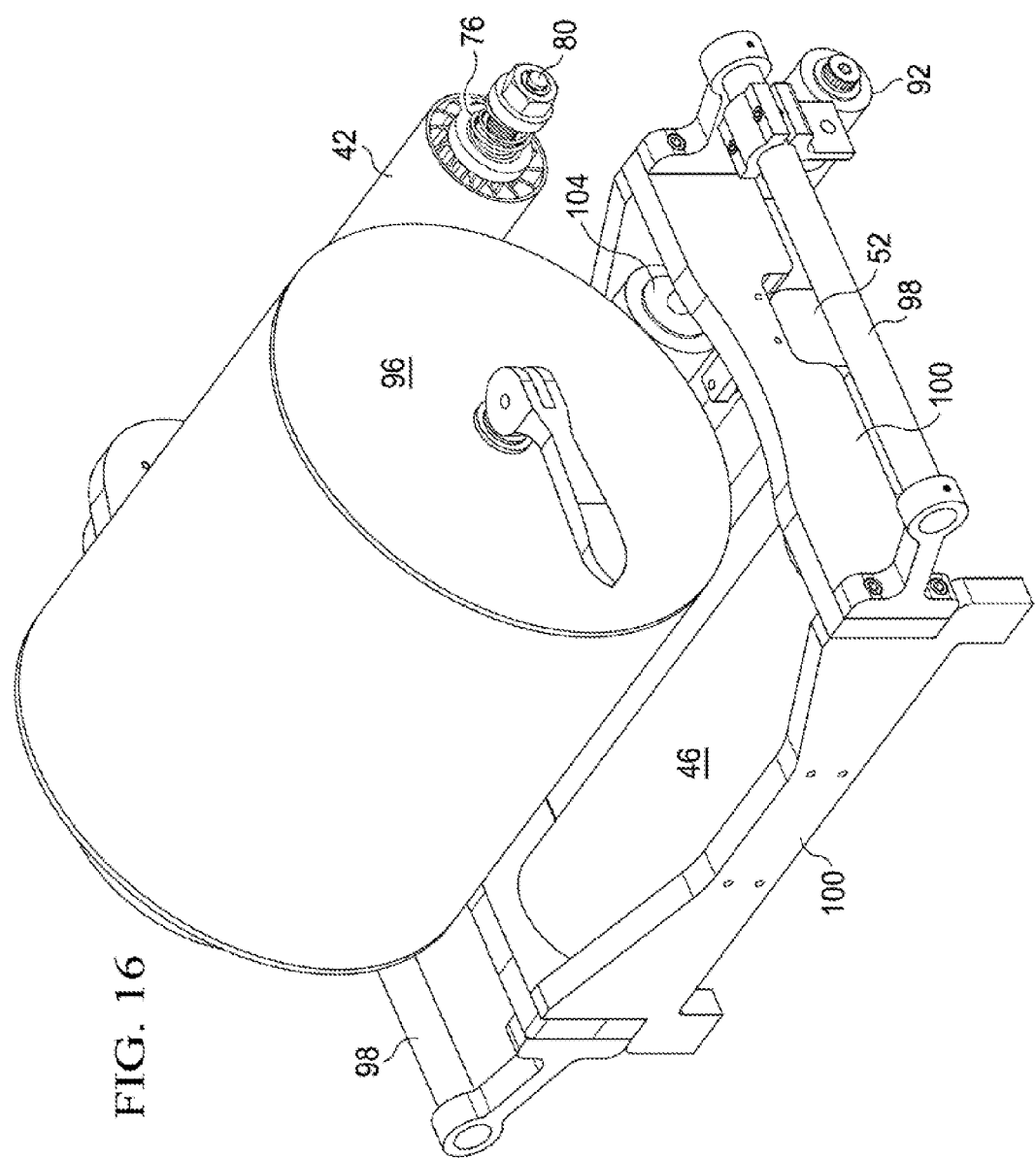
FIG. 16 is a perspective view of one side of the film feed roll assembly.
Figure 17:
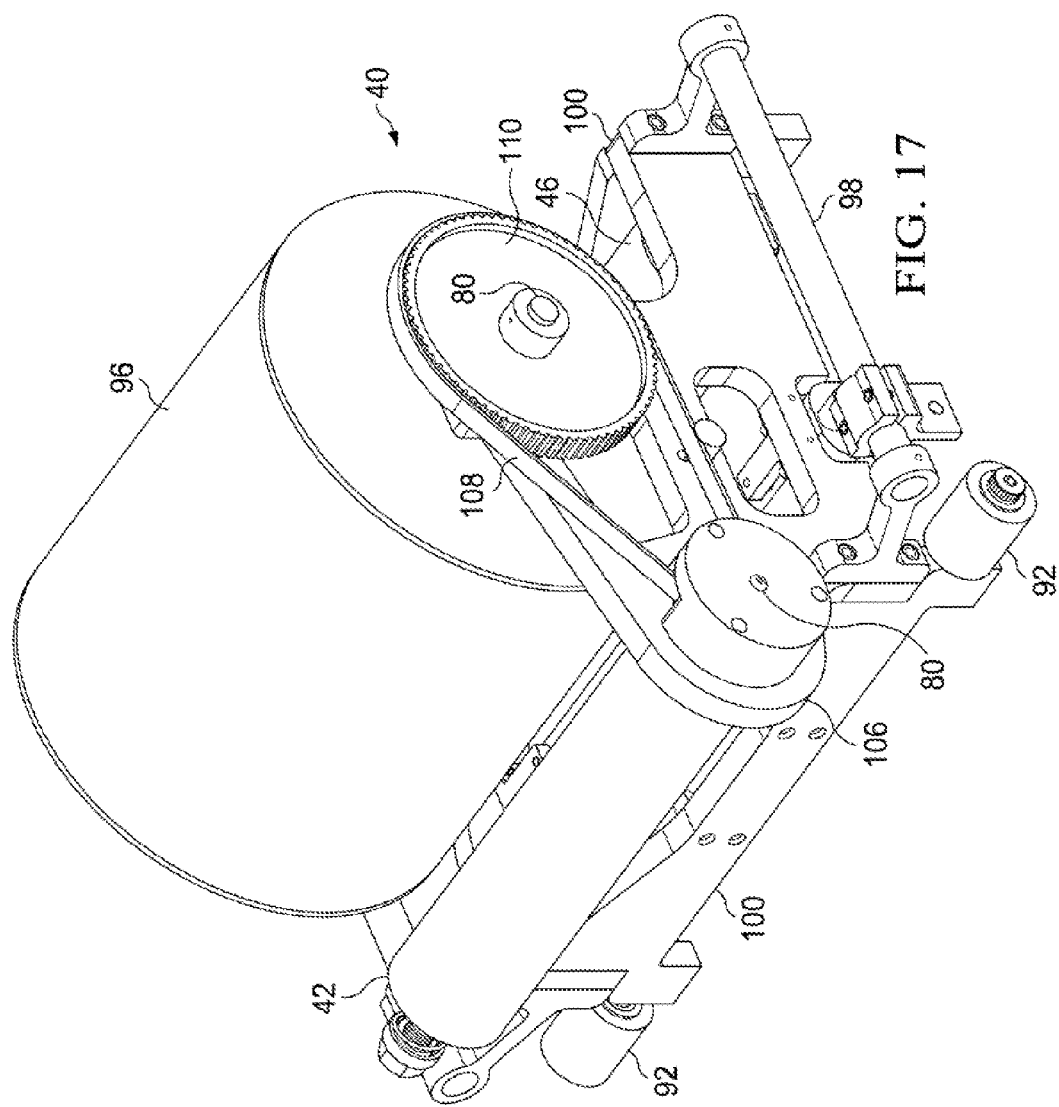
FIG. 17 is a perspective view of the other side of the film feed roll assembly.
Figure 18:
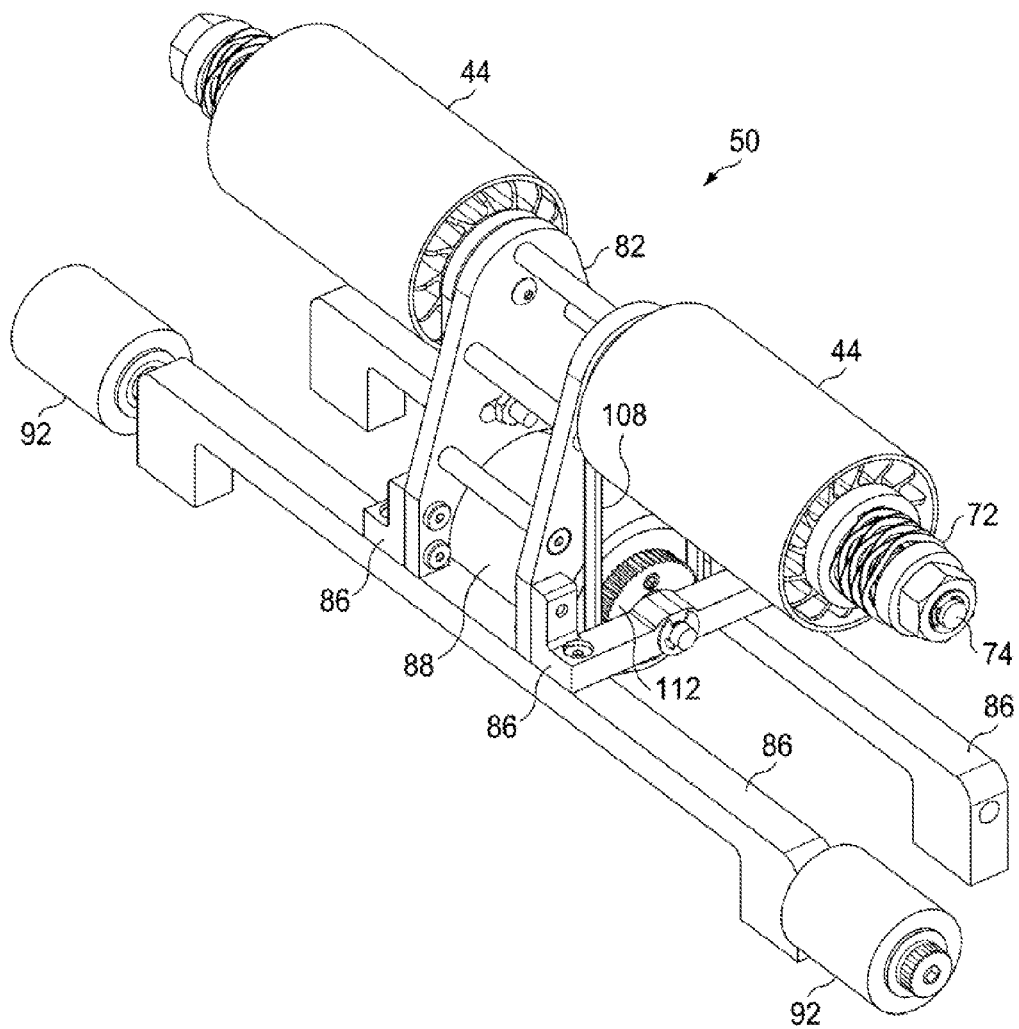
FIG. 18 is a perspective view of the film scrap take-up assembly.

Referring now particularly to FIGS. 13-17, the backer take-up reel 42 may be mounted on a shaft 80 by a spring loaded slip clutch 76, which may allow the take-up reel 42 to slip relative to the shaft 80 under certain conditions, discussed later. As best seen in FIGS. 14 and 17, the shaft 80 along with the feed roll 96 may be journaled for rotation on a support bracket 106 mounted on the upper frame 100. The shaft 80 may be driven by a take-up reel drive belt 108 coupled with a toothed pulley 110 attached to and driven by rotation of the feed roll 96, so that normally, the backer take-up reel 42 may rotate in synchronization with rotation of the feed roll 96 as the film 32 is drawn from the feed roll 96.

Referring now again to FIGS. 4-14, the compaction roller 46 may be journaled for rotation on the upper frame 100 and may be adapted to bear against the flange surface 60a. Film 32 drawn from the feed roll 96 may be fed to the nip 70 and then compacted against flange surface 60a by the compaction roller 46 so that the film 32 adheres substantially uniformly to flange surface 60a. Optionally, depending upon the application, a heater 52, which may comprise, without limitation, an infrared heater, may be mounted on the upper frame 100, forward of the compaction roller 46 and may extend across substantially the entire width of the base flange surface 60a. The heater 52 may function to heat the flange surface 60a in advance of placement of the film material 32 in order to promote adhesion of the film to the surface 60a. Other means of heating the base flange surface 60a immediately in advance of film placement may be possible.

A centrally located front fraction tire 104 (FIGS. 5, 9, 13, 14) may be journaled for rotation on the upper frame 100, and may be positioned above the forward set of the pinch rollers 38b. Spring-loading of the forward set of pinch rollers 38b may cause the front fraction tire 104 to be drawn down against the base flange surface 60a, effectively "pinching" the base flange 60 between the front fraction tire 104 and the forward set of pinch rollers 38b. Similarly, the base flange 60 may be pinched between the compaction roller 46 and the pinch rollers 38a, 38b.

Referring now to FIGS. 12-15 and 20-22, the film cutter assembly 48 may comprise a pair of laterally spaced link arms 118 that may be pivotally attached to a mounting bracket 114 by pivot pins 116. The mounting bracket 114 may be fixed to the upper frame 100, as best seen in FIGS. 8 and 13-15. Cutter follower arms 94 may be pivotally attached to the outer ends of link arms 118 by followers 126, which may be attached to link arms 118 by pivot shafts 129. Each of the followers 126 may include a lower guide surface 126a (FIGS. 21 and 22) that may bear against and guide the film 32 as the film 32 passes through the film cutter assembly 48. The lower guide surface 126a may be formed of a low friction material that is resistant to wear, such as, without limitation, a UHMW (ultrahigh molecular weight) polyethylene. Spring plates 128 may be fixed to the followers 126, and although not shown in the drawings, a spring may be connected between the spring plates 128 in order to bias the link arms 118 to swing inwardly toward each other.

Each of the cutter follower arms 94 may comprise an upper follower arm 122, and a lower follower arm 124, which may be spaced apart from each other to form film guide slots 102 into which the outer edges of the film 32 may be fed. Each of the upper follower arms 122 may be provided with a bearing pad 138 which may be formed of a low friction material that is resistant to wear, such as UHMW polyethylene, which is adapted to bear against the outer edges of the film 32 as it passes through the guide slots 102 in the cutter follower arms 94. Guide blocks 132 may be attached to the ends of the lower follower arms 124. Pivot blocks 130 may be secured to the guide blocks 132 and may include upper follower surfaces 130a that are respectively matched in geometry to the contour of the edges 66 of the elongate member 34.

In the illustrated example, the upper follower surfaces 130a may be beveled to match and engage the beveled edges 66 (FIG. 3) of the elongate member 34, beneath the film 32. The upper beveled follower surfaces 130a of the pivot blocks 130 may also include a layer of low friction material that is resistant to wear such as UHMW polyethylene. Cutter knives 134, which may be made of suitable wear resistant material (e.g., carbide), may be releasably attached to the cutter follower arms 94 by thumbscrews 136, which may hold the knives 134 against the followers 126, pivot blocks 130 and guide blocks 132. Moving the film applicator 30 along the elongate member 34 may force the cutter knives 134 through the film material 32 (including any backer that may be present on the film material 32), thereby trimming the film material 32 to match the width of the base flange surface 60a along the length of the elongate member 34. The cutter knives 134 may be guided by the beveled follower surfaces 130a on the pivot blocks 130 which may be biased into sliding engagement with the beveled edges 66 (FIG. 3) of the elongate member 34. Pivotal mounting of the beveled follower surfaces 130a together with the cutter knives 134 may allow the cutter knives 134 to individually follow and cut the film material 32 along the opposite beveled edges 66 of the elongate member 34, thereby matching the cut width of the film material 32 to the geometry of the top flange 60.

Attention is now directed to FIGS. 12, 13, 15 and 18, which illustrate additional details of the film, scrap take-up assembly 50. A pair of scrap take-up rollers 44 may be mounted on a shaft by means of a slip clutch 72 that allows the rollers 44 to slip relative to the shaft 74 under certain conditions described later in more detail. The shaft 74 may be journaled for rotation on an upright take-up support bracket 82 that may be attached to an adjacent pair of the mounting brackets 86. A rear fraction tire 88 may be made of any suitable material that achieves traction against the film 32. The rear traction tire 88 may be mounted for rotation on a pair of laterally spaced arms 85 (see FIG. 18) attached to brackets 86. A gear wheel 112 may be attached to the end of the fraction tire 88 and may be connected by a take-up reel drive belt 108 to a gear wheel (not shown) on the shaft 74. Rotation of the fraction tire 88 as a result of rolling over the film 32 during the film placement process may drive rotation of the take-up rollers 44 through drive belt 108.

In operation, a supply of the film material 32 may be loaded onto the feed roll 96 in preparation for covering the flange surface 60 of the elongate member 34 with material. As previously discussed, the elongate member 34 may be placed in a fixture that is designed to hold the elongate member 34 in a fixed, inverted position during the film placement process. The film applicator 30 may be loaded onto one end of the elongate member 34 and the film 32 may be drawn down and into the nip 70 (FIG. 13) between the compaction roller 46 and the flange surface 60*a*, while the backer 56 is separated and partially wrapped around the backer take-up reel 42. In cases where a fixture is used to hold the elongate member 34, the outrigger wheels 92 may be placed on the fixture in preparation for rolling the film applicator 30 down the length of the elongate member 34.

Workers may grasp the handlebars 98 to move the film applicator 30 along the length of the elongate member 34. In some embodiments, however, it may be possible to move the film applicator 30 along the elongate member 34 using a computer-controlled equipment (e.g., a winch), modifications to incorporate self-powering operation, or other automated equipment. The heater 52 may heat the flange surface 60*a* immediately ahead of the compaction roller 46. Linear movement of the film applicator 30 may draw film material 32 from the film feed roll 96. As the film material 32 is fed to the compaction roller 46, the backer 56 may be taken up on the backer take-up reel 42, which may be belt driven by the rotation of the feed roll 96. In the event that the feed roll 96 rotates more quickly than the backer take-up reel 42, the slip clutch 76 may allow dynamic slipping of the backer take-up reel 42.

Figure 22:
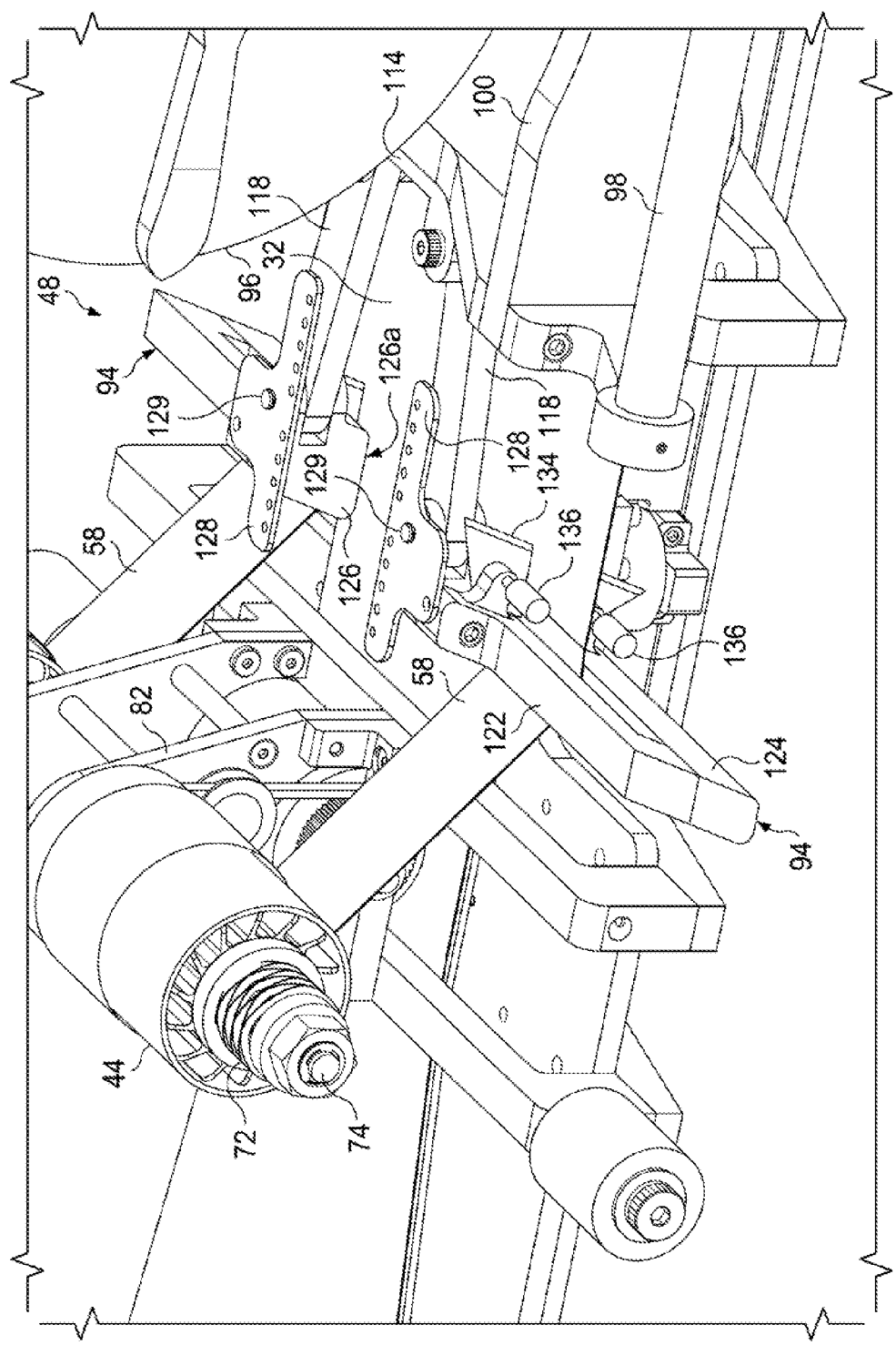
FIG. 22 is a perspective view of the film cutter assembly shown in FIGS. 20 and 21, illustrating edges of a film being cut.

After the film 32 has been compacted beneath the compaction roller 46, the film cutter assembly 48 may trim away edges of the film 32 to match the width of the flange surface 60*a*, even in cases where the width of the base flange surface 60*a* may vary along the length of the elongate member 34. As best seen in FIG. 22, inward biasing of the link arms 118 may result in the cutter knives 134 cutting the film 32 at the edges of the base flange surface 60*a*. The film scrap 58 may pass through the guide slots 102 in the cutter follower arms 94 and may be taken up on the scrap take-up rollers 44. The scrap take-up rollers 44 may be belt driven by the rear traction tire 88. In the event that the scrap take-up rollers 44 rotate more slowly than the rear traction tire 88, the slip clutch 72 may allow dynamic slipping of the rollers 44.

Figure 19:
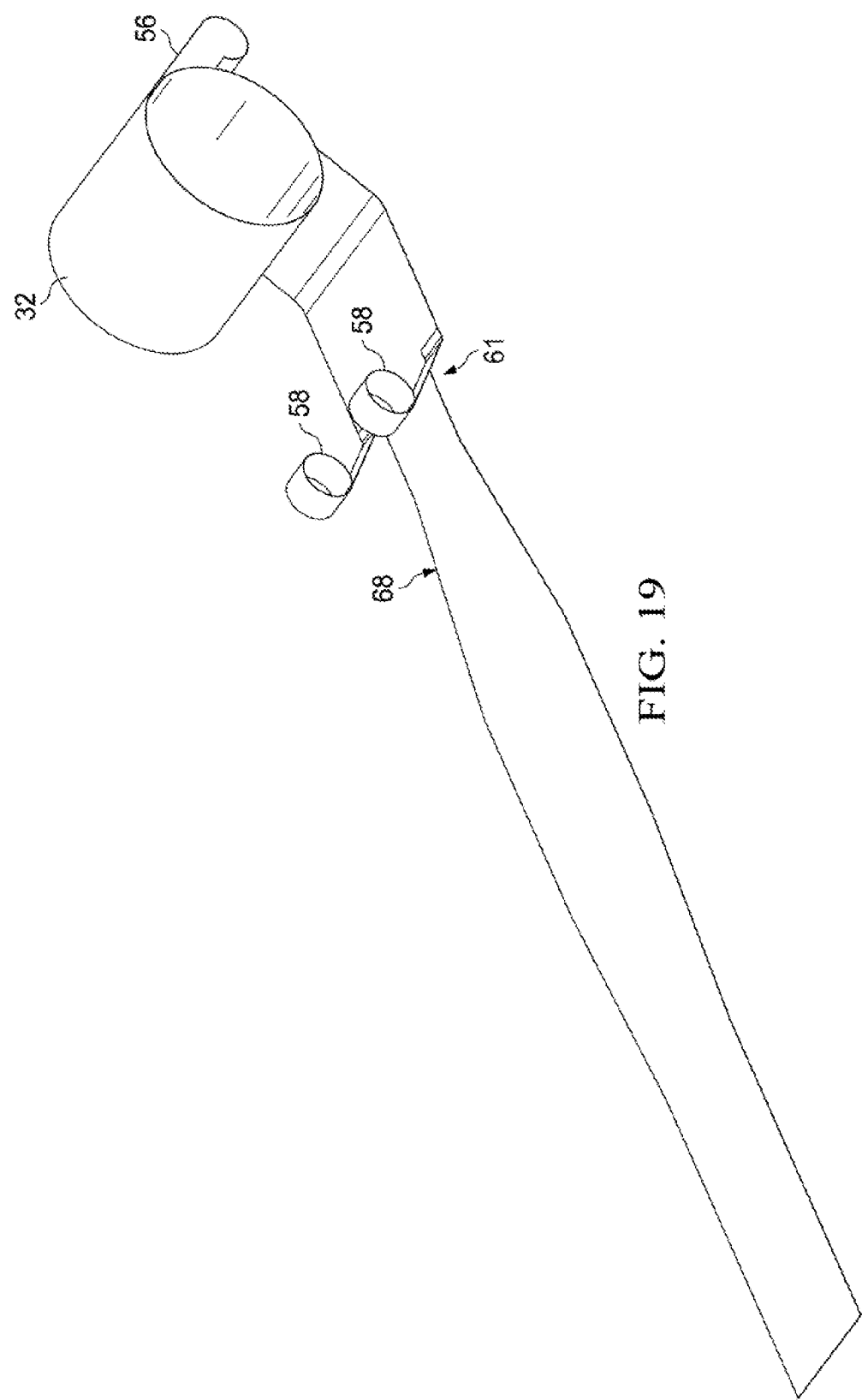
FIG. 19 is a perspective view of the film material, diagrammatically showing the portions that are dispensed, placed, trimmed and taken up.
Figure 20:
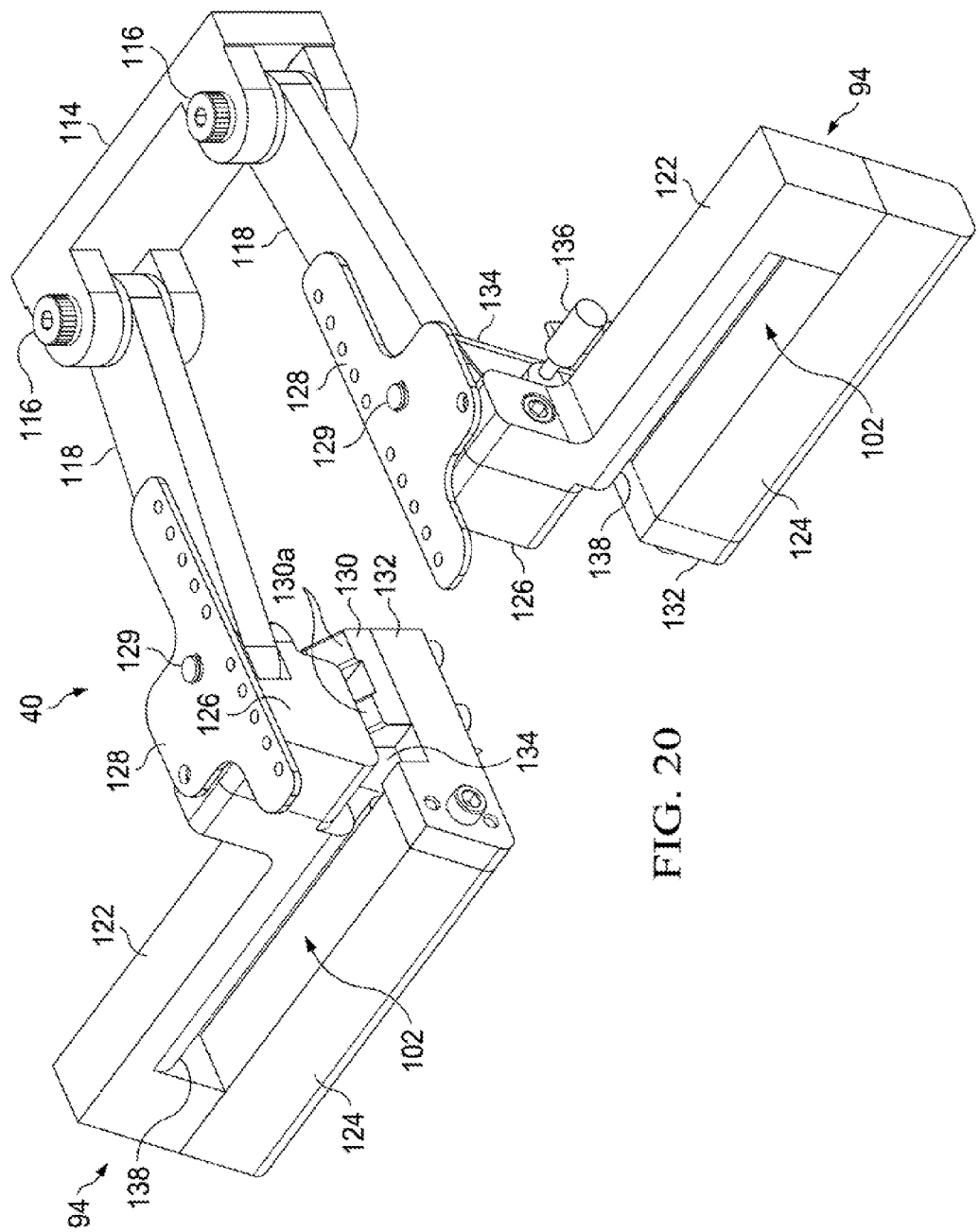
FIG. 20 is a front perspective view of the film cutter assembly.
Figure 21:
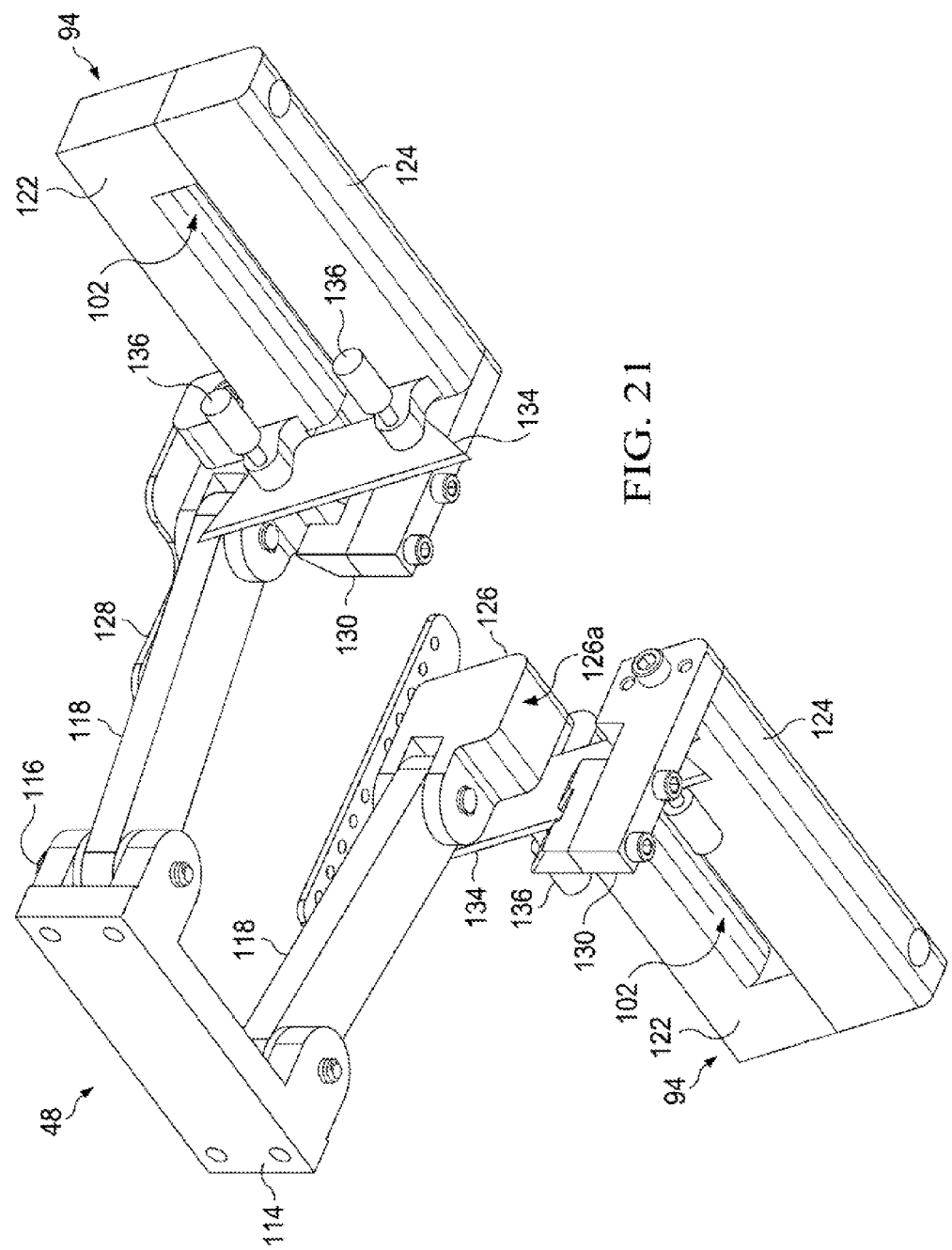
FIG. 21 is a rear perspective view of the film cutter assembly.

FIG. 19 diagrammatically illustrates processing of the film 32 during the film material placement process. The film material 32 may be drawn from the feed roll 96 and the backer 56 may be rolled up on the backer take-up reel 42. The film 32 may be compacted and then cut at 61. Film scrap 58 may be rolled up onto the film scrap take-up reels 44 as the film 32 is cut to match the width of the flange surface 60*a*, including along the flange taper 68.

Figure 23:
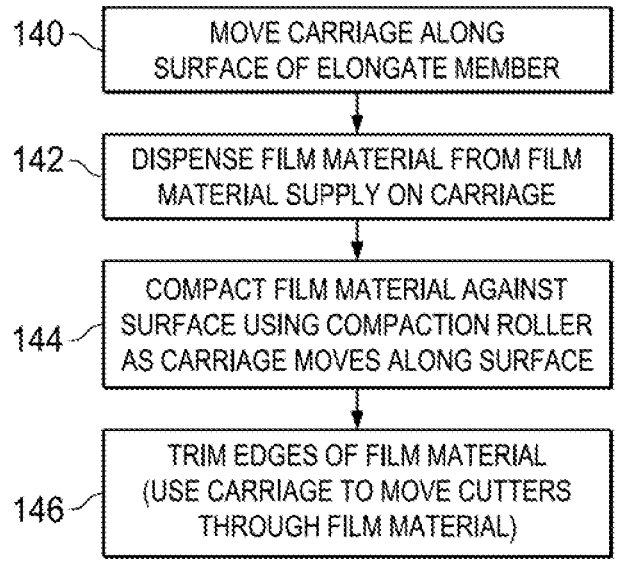
FIG. 23 is a flow diagram of an embodiment of a method for applying a film material along a surface of elongate member.

FIG. 23 illustrates the overall steps of a method for applying film 32 to the surface 60*a* of an elongate member 34. At 140, a carriage 36 may be moved along the surface 60*a* of the elongate member 34, and at 142 the film 32 may be dispensed from a film supply 40 on the carriage 36. At 144, the film 32 may be compacted against the surface 60*a* using a compaction roller 46 as the carriage 36 moves along the surface 60*a*. At step 146, the edges of the film 32 may be trimmed, using the carriage 36 to move cutter knives 134 through the film 32.

Figure 24:
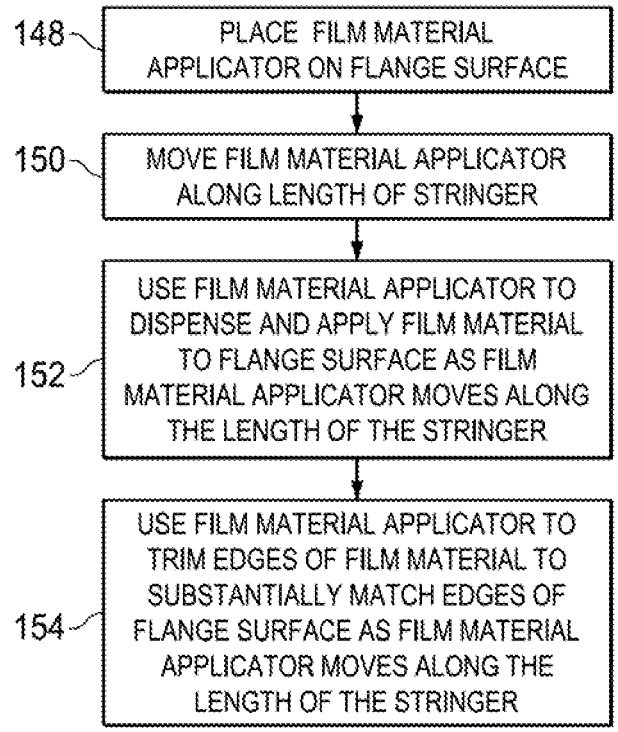
FIG. 24 is a flow diagram of a method for using the film applicator to apply film material on the flange of a stringer.

FIG. 24 illustrates the overall steps of a method for applying film material 32 over the length of a base flange surface 60*a* on a composite elongate member 34. Beginning at 148, a film applicator 30 may be placed on the flange surface 68*a*. At 150, the film applicator 30 may be moved along the length of the elongate member 34. At 152, the film applicator 30 may be used to dispense and apply a film material 32 to the flange surface 60*a* as the film applicator 30 moves along the length of the elongate member 34. At 154, the film applicator 30 may be used to trim edges of the film material 32 to substantially match edges of the flange surface 60*a* as the film applicator 30 moves along the length of the elongate member 34.

Figure 25:
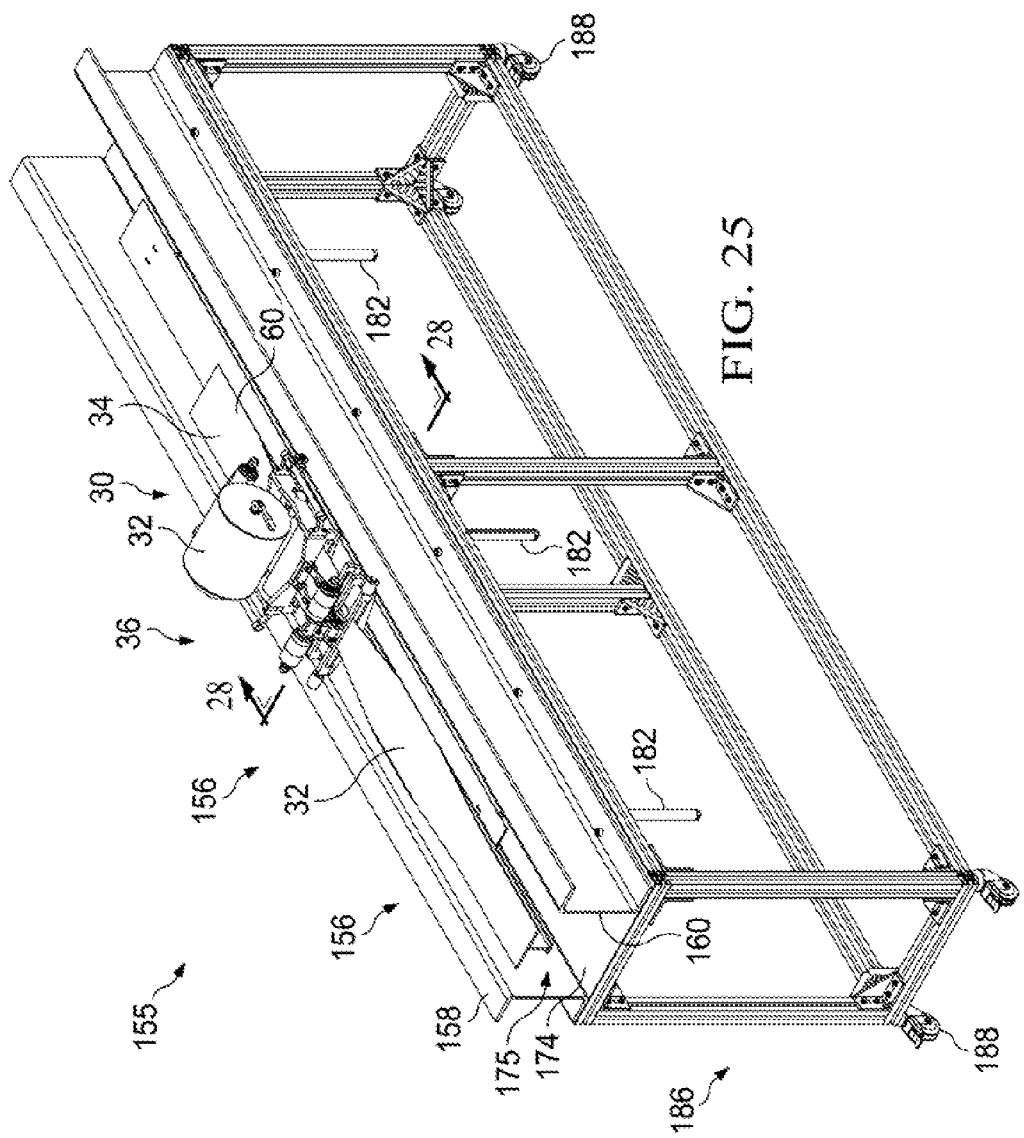
FIG. 25 is a perspective view of one side of the apparatus, shown mounted on a fixture for holding the elongate member.
Figure 26:
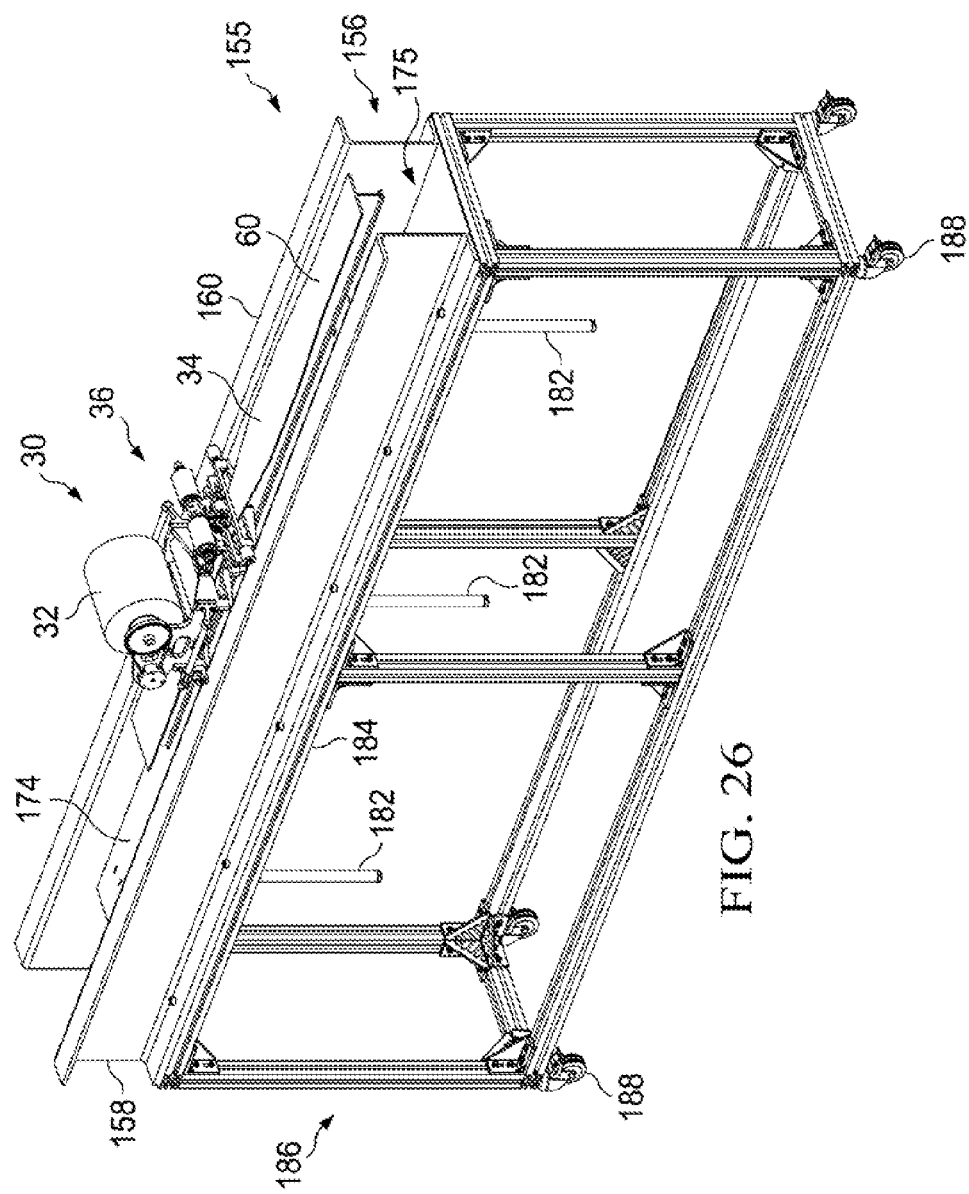
FIG. 26 is a perspective view similar to FIG. 25, but showing the opposite side of the apparatus and the holding fixture.
Figure 27:
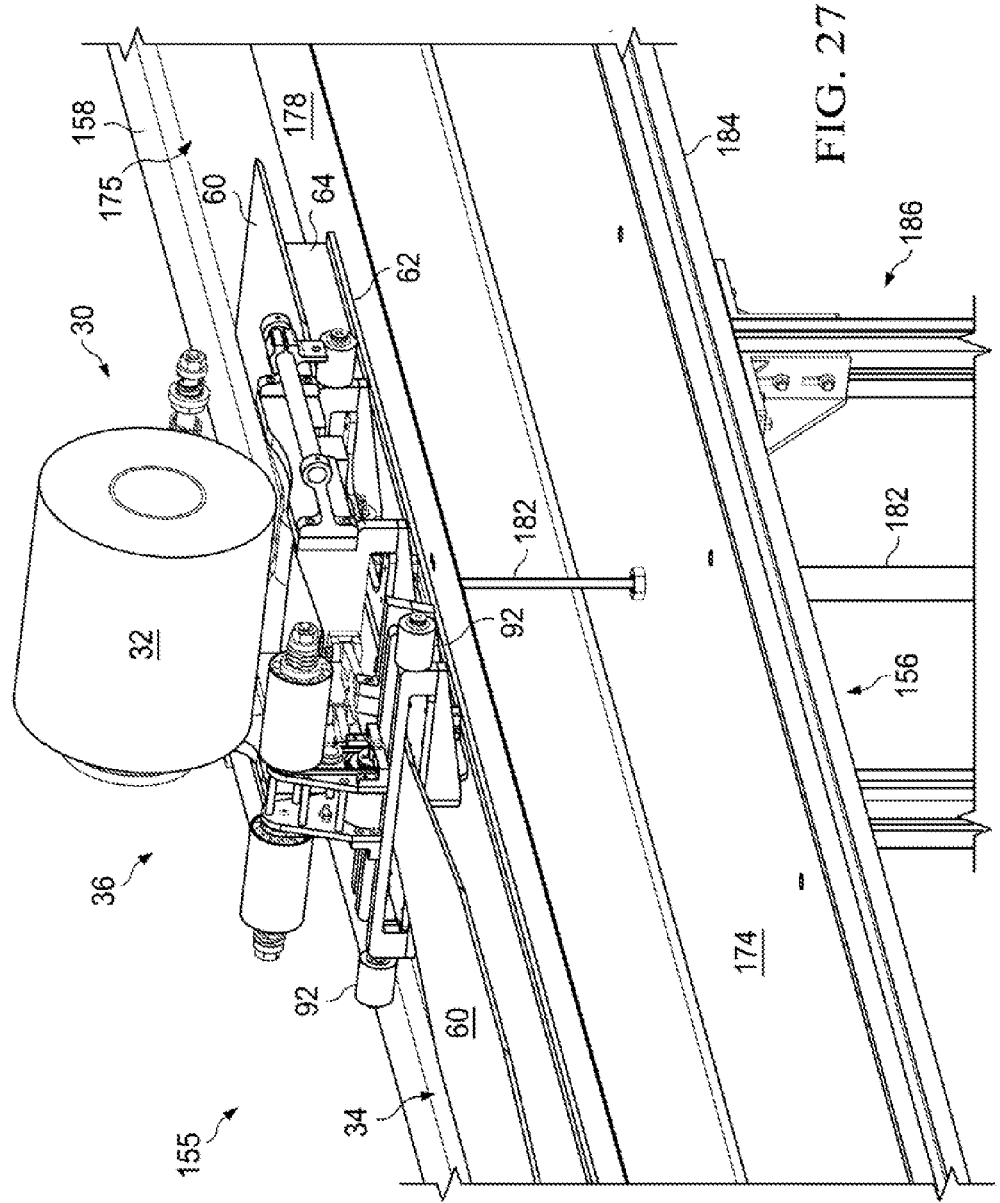
FIG. 27 is a perspective view of the apparatus and holding fixture shown in FIGS. 25 and 26, one of the beams of the holding fixture having been removed for clarity.

Attention is now directed to FIGS. 25 and 26, which illustrate a holding system 155 that may be used to hold the elongate member 34 (e.g., a stringer) as the film applicator 30 applies film material 32 to the top flange 60 of the elongate member 34. While a stringer is illustrated, the disclosed holding system 155 may be employed to hold and stabilize any of a variety of the elongate members in a desired, weight-neutral position while a processing operation is being performed on the elongate member 34. The film applicator 30 is only an example of various equipment that may be used in processing the elongate member 34 while being held by the holding system 155.

The holding system 155 may include a holding fixture 156, which may be mounted on a table 184 supported in an elevated position on a frame 186. The frame 26 may include wheels 188 allowing transport within a factory environment (not shown). The holding fixture 156 may broadly include a pair of spaced apart beams 158, 160 mounted on a base 174. In some embodiments, the beams 158, 160 and the base 174 may be integrated together as a single structure. The spaced apart beams 158, 160 may define a channel 175 therebetween within which the elongate member 34 may be placed and held in a desired position during a process operation, such as during the application of the adhesive film 32 previously described. As will be discussed below in more detail, the holding fixture 156 may function in combination with the carriage 36 to hold the elongate member 34 in a desired weight-neutral position and constrain it during the application process. In the illustrated example, the elongate member 34 may be held and stabilized in an inverted position, such that the top flange 60 is exposed, and is presented to the applicator 30 at a position that allows film adhesive 32 to be applied to the elongate member 34, while maintaining the elongate member 34 substantially weight neutral during the application process. The vertical position at which the elongate member 34 is supported relative to the applicator 30 may be adjusted using actuator rods 182, discussed in more detail below.

Attention is now directed to FIGS. 27-31, which illustrate additional details of the holding system 155. Each of the beams 158, 160 may be U-shaped in cross section and may comprise upper and lower, outwardly turned flanges 166, 168 respectively connected by a web 162. Other cross-sectional shapes for the beams 158, 160 are possible. The upper flanges 166 respectively include upper track surfaces 190. The outrigger wheels 92 of the carriage 36 may rest on the track surfaces 190 and mount the carriage 36 for rolling movement along the length of the beams 158, 160. The holding fixture 156 may further include a stringer support assembly 176 mounted on the base 174 and centrally located between the beams 158, 160, in the transverse direction. The stringer support assembly 176 may extend substantially the entire length of the holding fixture 156 and may be adapted to support the elongate member 34 (e.g., stringer) thereon in a desired position, at a desired height. The stringer support assembly 176 may comprise a stringer support surface defined by an elongate support plate 170 mounted on a series of longitudinally spaced T-blocks 180. The T-blocks 180 may be supported on extendable actuator rods 182, which form part of actuators 172. The actuators 172 may be mounted on, and extend downwardly beneath the base 174. The actuators 172 may be pneumatic, hydraulic or electrical, and may be automatically controlled by a programmed computer or a controller (not shown). The actuator rods 182 may effectively form stringer-supporting struts that are linearly displaceable within the channel 175. In the illustrated embodiment, the elongate member 34 may be supported in an inverted position on the stringer support assembly 176, with the bottom flange 62 of the elongate member 34 resting on the support plate 178.

The spacing D between the stringer support plate 178 and the track surface 190 may be selected such that the top flange 60 of the elongate member 34 is supported at an elevation that is substantially matched to the compaction roller 46 (see FIG. 13) of the applicator 30. Matching the elevation of the top flange 62 to that of the compaction roller 46 may assure that the adhesive film 32 is compacted against the top flange 60 with a desired amount of pressure in order to smoothly tack the film 32 to the surface of the flange 60. The vertical position of the elongate member 34 and, thus, of the spacing D may be adjusted using the actuators 172 to control the length of extension of the actuator rods 182. It may also be possible to use the actuators 172 to make adjustments in the stringer support plate 178 in order to accommodate stringers 34 that may have one or more contours (not shown) along their length.

As previously discussed, the holding fixture 156 may cooperate with the carriage 36 to hold and constrain the elongate member 34 in a desired position during the film application process so that the elongate member 34 is substantially weight neutral. This weight neutrality may be achieved, in part, by the use of spring-loaded pinch rollers 38, which may act as actuators that pinch and hold both the top flange 60 and the web 64 as the bottom flange 62 is being supported on the stringer support plates 178. The pinching force provided by the pinch rollers 38 may assist in constraining the elongate member 34 against vertical or lateral movement as the film material 32 is being applied. Weight neutrality of the elongate member 34 may also be achieved using the actuators 172 to adjust the precise height of the elongate member 34 relative to the applicator 30.

Figure 32:
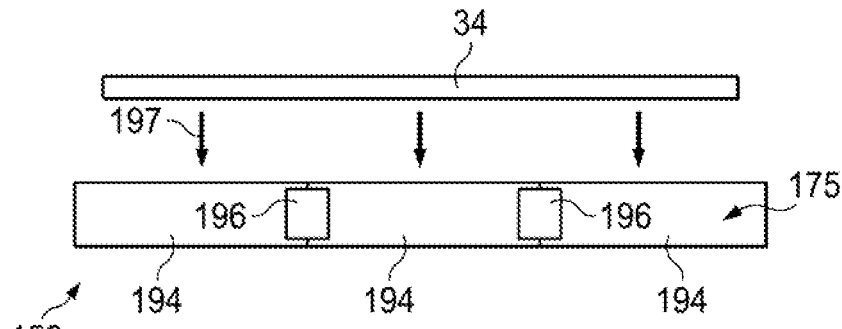
FIG. 32 is a diagrammatic side view of a holding system employing modular holding fixtures.

The holding fixture 156 described above may have a modular construction allowing stringers 34 of various lengths to be held during the film application or other processes. For example, referring to FIG. 32, the holding fixture 156 may comprise a plurality of holding fixture modules 194, each of which is substantially similar to the holding fixture 156 shown in FIGS. 25-31. The holding fixture modules 194 may be joined together using any suitable means, such as, without limitation, splice plates 196. The holding fixture modules 194 may or may not be of equal lengths, and, when assembled, may form a channel 175 that is sufficient in length to receive 192 the entire length of the elongate member 34.

Figure 33:
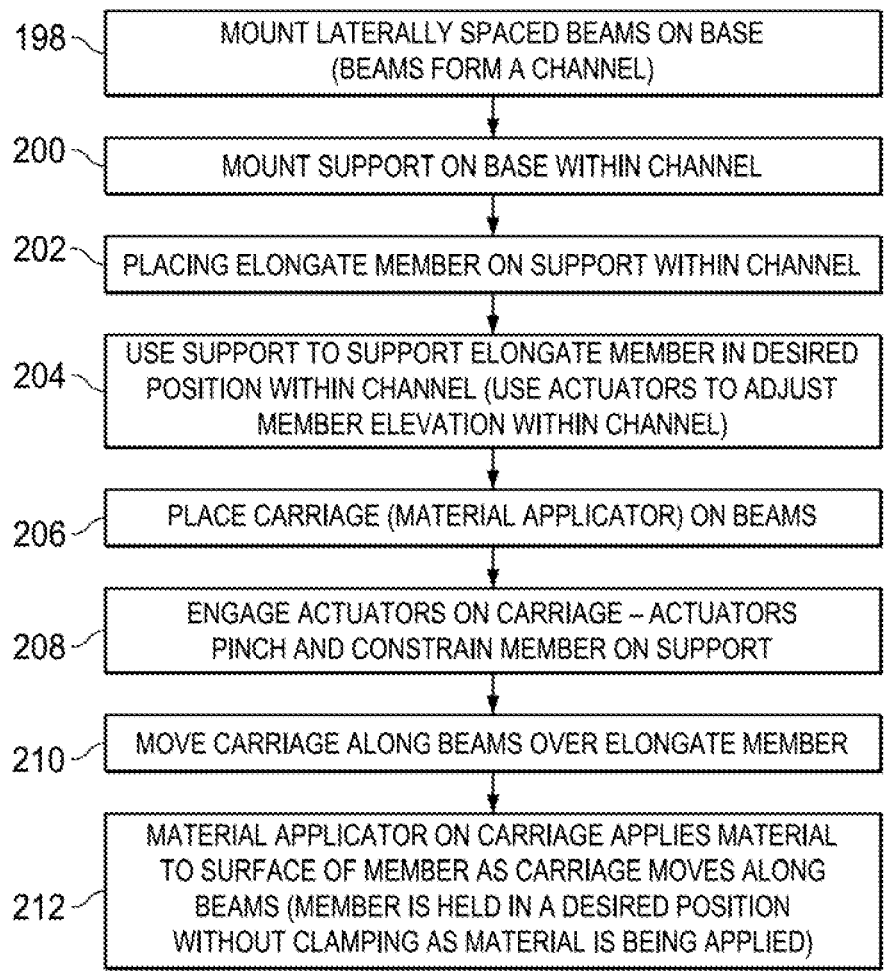
FIG. 33 is a flow diagram of a method for holding an elongate member during processing.

Attention is now directed to FIG. 33, which illustrates the overall steps of a method for holding an elongate member 34 (e.g., a stringer) in a desired position and orientation as a process, such as adhesive film application, is being carried out. Beginning at 198, laterally spaced beams 158, 160 may be mounted on a base 174, which may form a channel 175 therebetween. At step 280, a support 176 may be mounted within the channel 175 that is adapted to support an elongate member 34, such as a stringer. At 202, the elongate member 34 may be placed on the support 176 within the channel 175. At step 204, the support 176 may be used to support the elongate member 34 in a desired position and/or orientation within the channel 175. As previously explained, actuators 172 may be used to adjust the elevation of the elongate member within the channel 175. At step 206, a carriage 36, which may include a material applicator, may be placed on the beams 158, 160. At step 208, pinch rollers 38 on the carriage 36 may be engaged to pinch and constrain the elongate 34 member, which has been placed on the support 176. At step 210, the carriage 36 may be moved along the beams 158, 160 over the elongate member 34. Depending upon the process being carried out, at step 212, a material applicator on the carriage 36 may be used to apply material 32 to the surface of the elongate member 34 as the carriage 36 moves along the beams 158, 160. As the carriage 36 moves along the beam 158, 160, the elongate member 34 may be held in a desired weight-neutral position without the need for clamping, as the material 32 is being applied.

Figure 34:
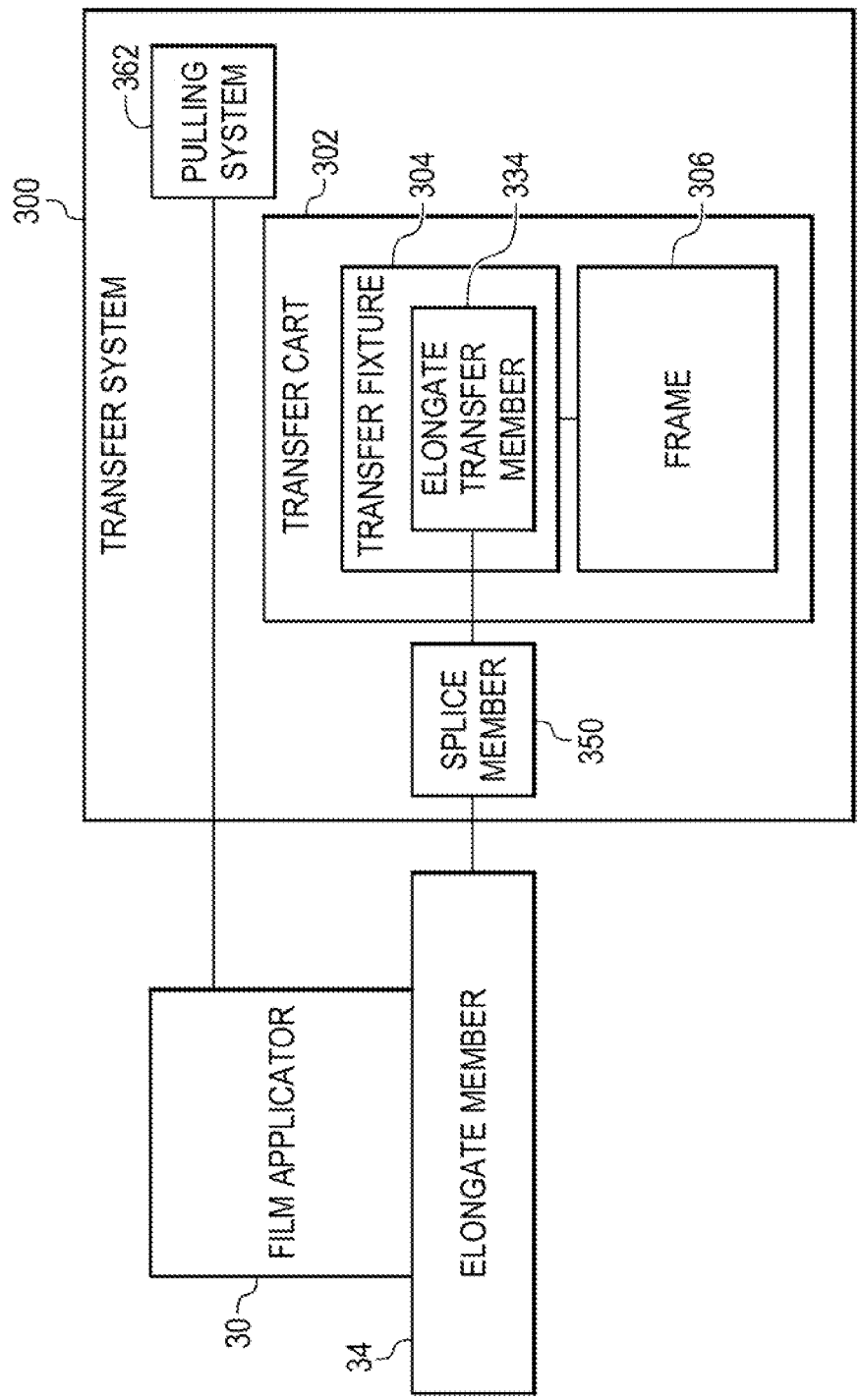
FIG. 34 is a functional block diagram of a transfer system according to an embodiment of the disclosure.

Attention is now directed to FIG. 34, which illustrate a transfer system 300 that may be used to receive a film applicator 30 from an elongate member 34 (e.g., a stringer), to hold the film applicator 30, and to transfer the film applicator 30 to another elongate member 34. The transfer system 300 may include a transfer cart 302 that may be moved relative to the film applicator 30 and the elongate member 34. The transfer cart 302 may include a transfer fixture 304 mounted on a frame 306. The transfer fixture 304 may include an elongate transfer member 334 that may be aligned with the elongate member 34, and may act as a surrogate for the elongate member 34, when the film applicator 30 is moved from the elongate member 34 to the transfer cart 302. A splice member 350 may provide a transition between the elongate member 34 and the elongate transfer member 334. A pulling system 362 may supply the force necessary to move the film applicator 30 from the elongate member 34 to the elongate transfer member 334 of the transfer cart 302.

Figure 35:
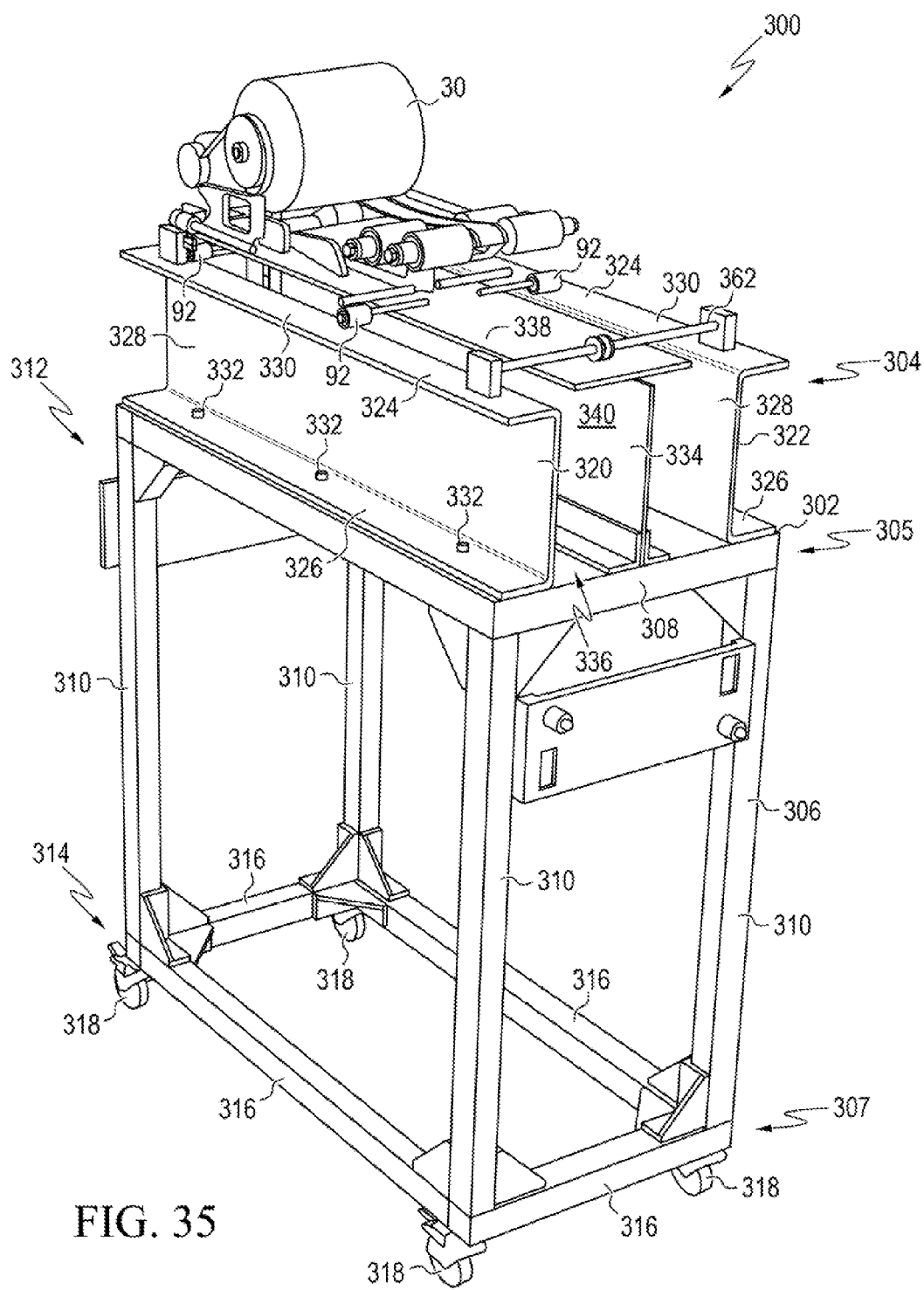
FIG. 35 is a perspective view of one embodiment of the disclosed transfer system.
Figure 36:
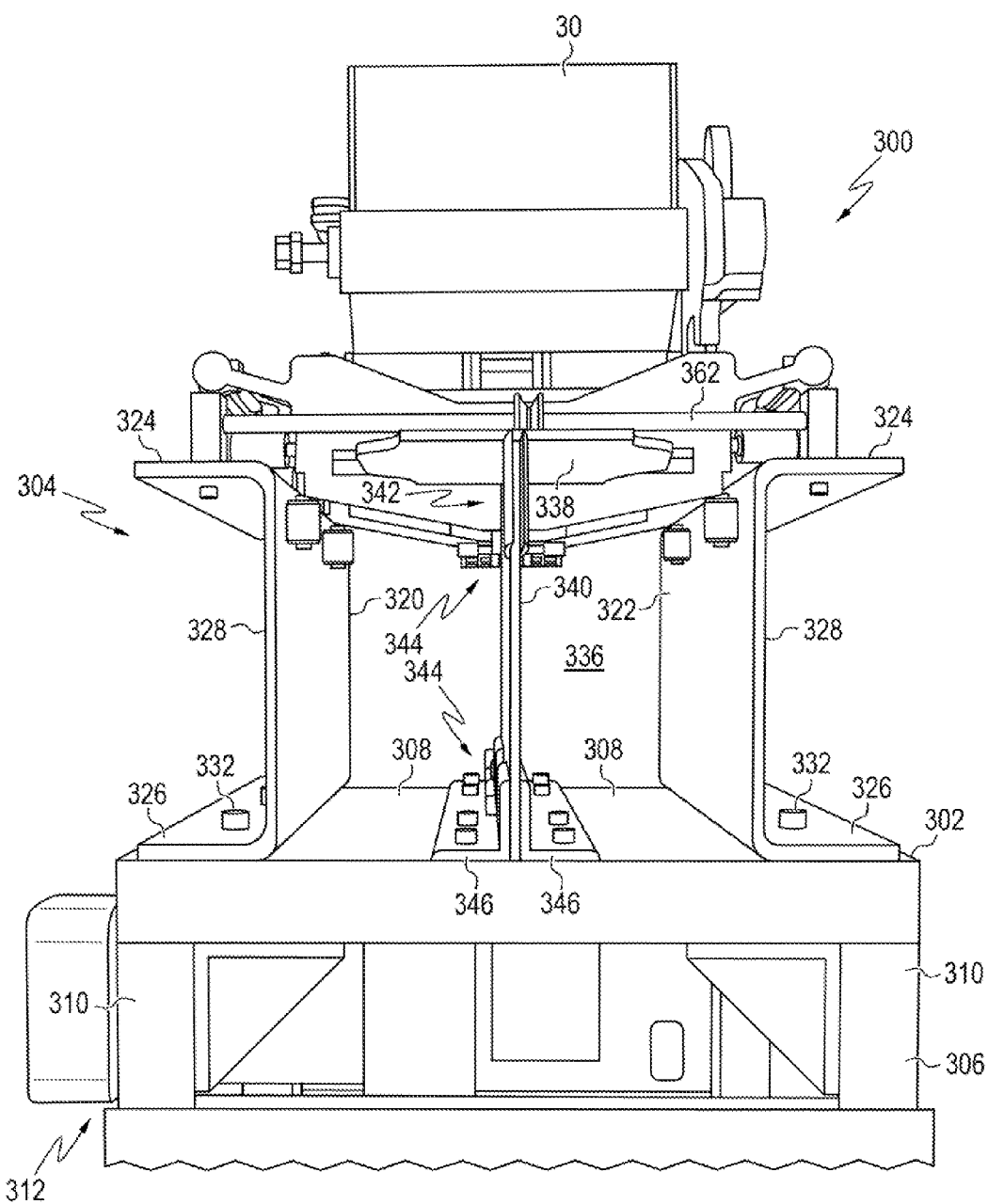
FIG. 36 is a front elevational view of the transfer system of FIG. 35, shown with a splice member.

Referring to FIGS. 35 and 36, in one particular construction of the disclosed transfer system 300, the transfer cart 302 may include a transfer fixture 304 mounted on a frame 306 having an upper end portion 305 and a lower end portion 307. The frame 306 may support the transfer fixture 304 in an elevated position such that the transfer fixture 304 may receive the film applicator 30, such as from the holding system 155 shown in FIGS. 25 and 26. While a specific film applicator 30 (and holding system 155 (FIG. 25)) is shown, the transfer system 300 may be employed to receive, hold and transfer various equipment relative to an elongate member 34 without departing from the scope of the present disclosure.

The frame 306 of the transfer cart 302 may include a mounting platform 308 and legs 310. Each leg 310 of the frame 306 may include an upper end 312 and a lower end 314. The upper end 312 of each leg 310 may be connected to the mounting platform 308. For example, the mounting platform 308 may be generally rectangular in plan view and one leg 310 may be connected proximate each corner of the mounting platform 308. The lower ends 314 of the legs 310 may be interconnected by reinforcing members 316.

The transfer cart 302 may additionally include ambulation devices 318 connected to the frame 306 to facilitate transport of the transfer cart 302 within a factory environment (not shown). For example, the ambulation devices 318 may be casters, rollers, wheels or the like. The ambulation devices 318 may be connected to the lower ends 314 of the legs 310 of the frame 306. Therefore, the ambulation devices 318 may facilitate rolling the transfer cart 302 along a surface (e.g., the floor) in a factory environment.

The transfer fixture 304 of the transfer cart 302 may include a pair of spaced apart beams 320, 322 and an elongate transfer member 334. Therefore, the transfer fixture 304 of the transfer cart 302 may mimic the holding fixture 156 and elongate member 34 of the holding system 155 shown in FIGS. 25 and 26.

Each beam 320, 322 of the transfer fixture 304 may be generally C-shaped or U-shaped in cross-section. Therefore, each beam 320, 322 may include an upper outwardly turned flange 324 and a lower outwardly turned flange 326. The upper and lower flanges 324, 326 may be connected by a web 328. Other cross-sectional shapes for the beams 320, 322 are also possible.

The transfer fixture 304 may be mounted on the mounting platform 308 of the frame 306 by connecting the lower flanges 326 of each beam 320, 322 to the mounting platform 308. For example, mechanical fasteners 332, such as bolts, screws, rivets and the like, may extend through holes in the lower flanges 326 of each beam 320, 322 to connect the transfer fixture 304 to the frame 306. However, those skilled in the art will appreciate that the transfer fixture 304 may be integral with the frame 306.

The upper flange 324 of each beam 320, 322 may include a track surface 330. The outrigger wheels 92 of the film applicator 30 may rest on the track surfaces 330 to facilitate rolling movement of the film applicator 30 along the length of the beams 320, 322.

The beams 320, 322 of the transfer fixture 304 may be spaced apart to define a channel 336 therebetween. The elongate transfer member 334 may be positioned in the channel 336 and may be secured to the mounting platform 308 of the frame 306.

The elongate transfer member 334 may include a base flange 338 and a web 340. The web 340 may include an upper end 342 and a lower end 344. The upper end 342 of the web 340 may be connected to the base flange 338. The lower end 344 of the web 340 may be connected to the mounting platform 308 of the frame 306 such that the base flange 338 of the elongate transfer member 334 is substantially parallel with the upper flanges 324 of the beams 320, 322. For example, mechanical hardware 346, such as L-brackets, may secure the lower end 344 of the web 340 to the frame 306.

In one particular construction, the elongate transfer member 334 may be formed as a generally T-shaped member. For example, the elongate transfer member 334 may have a cross-sectional profile that closely corresponds to the cross-sectional profile of the elongate member 34 shown in FIG. 3.

Figure 28:
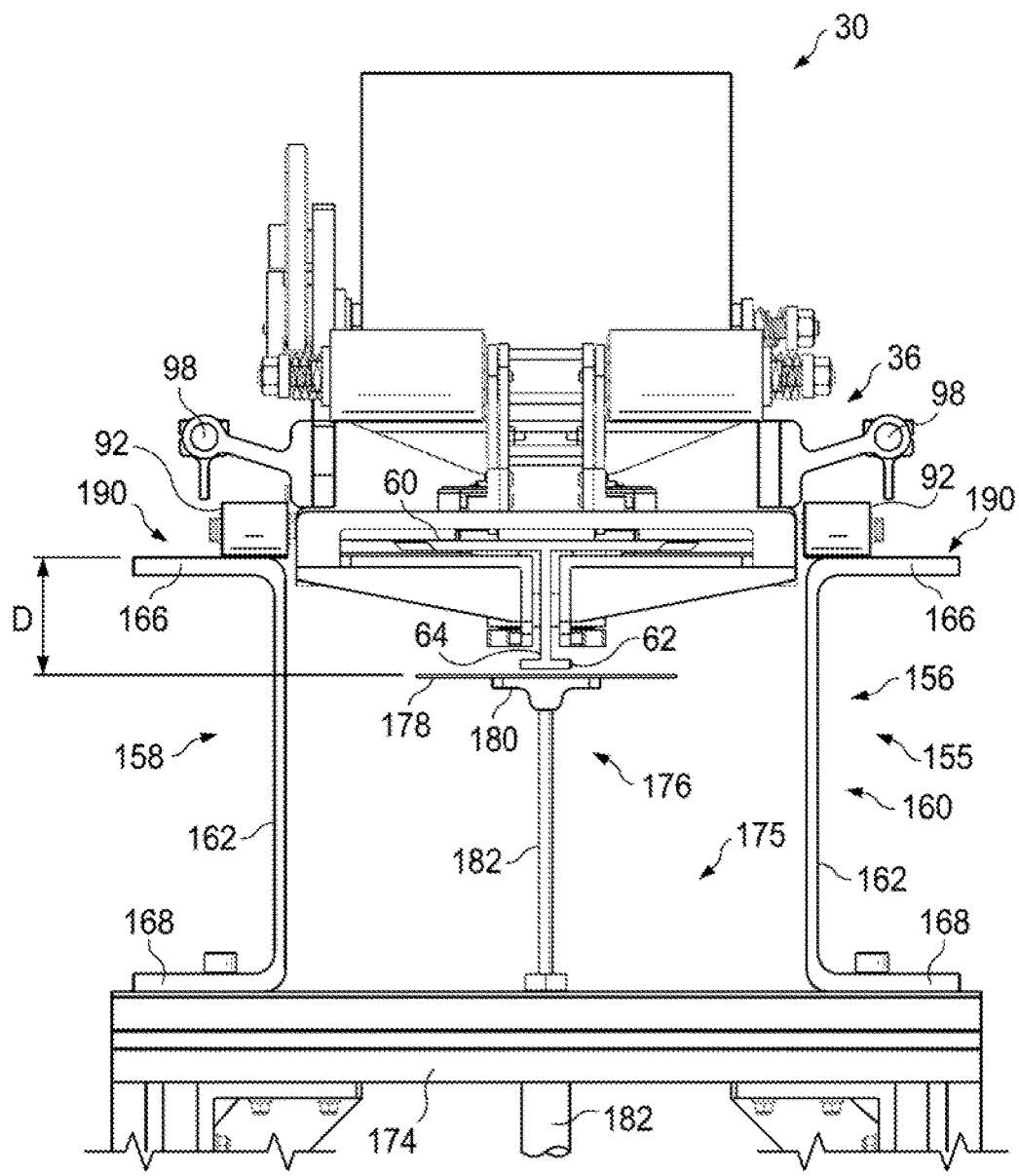
FIG. 28 is a sectional view taken along the line 28-28 in FIG. 25.
Figure 29:
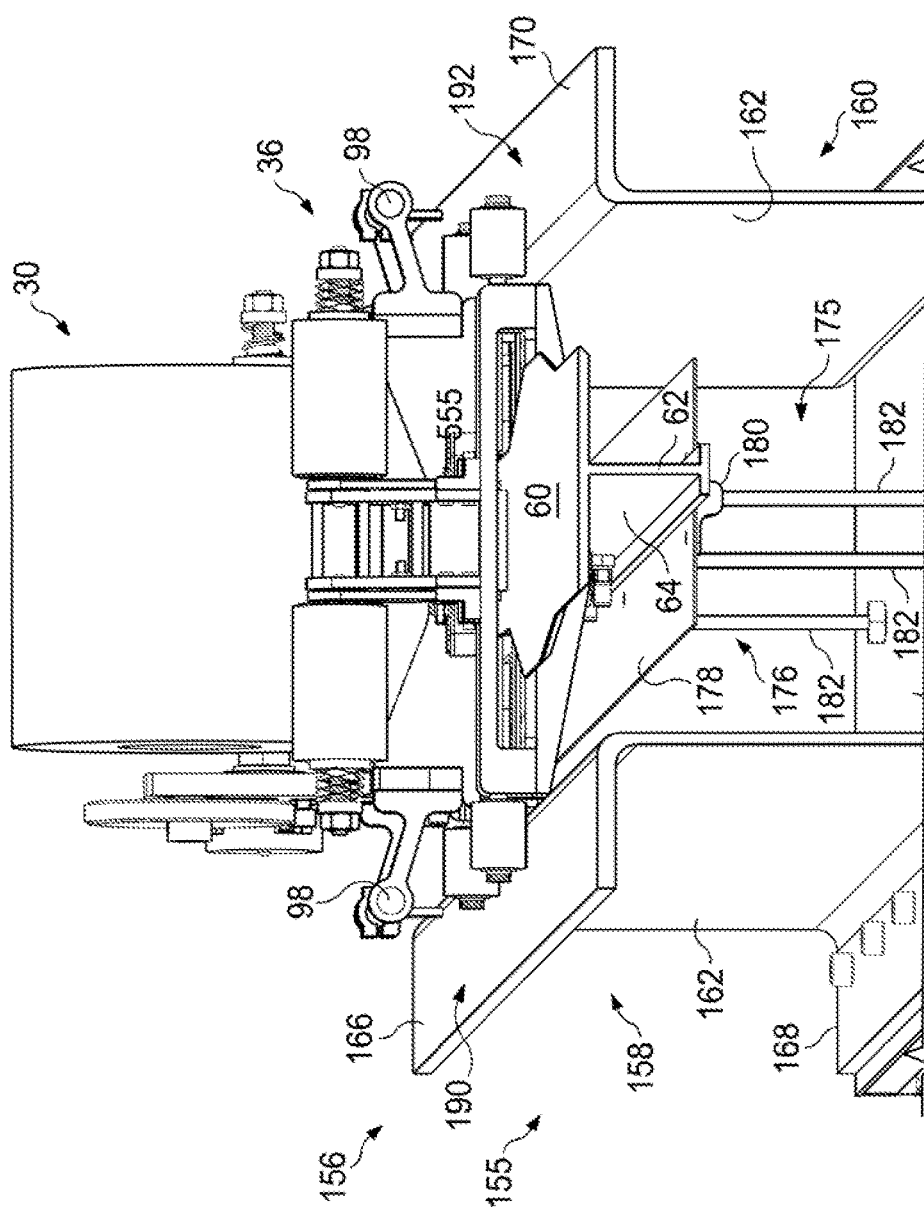
FIG. 29 is a perspective, cross-sectional view.
Figure 30:
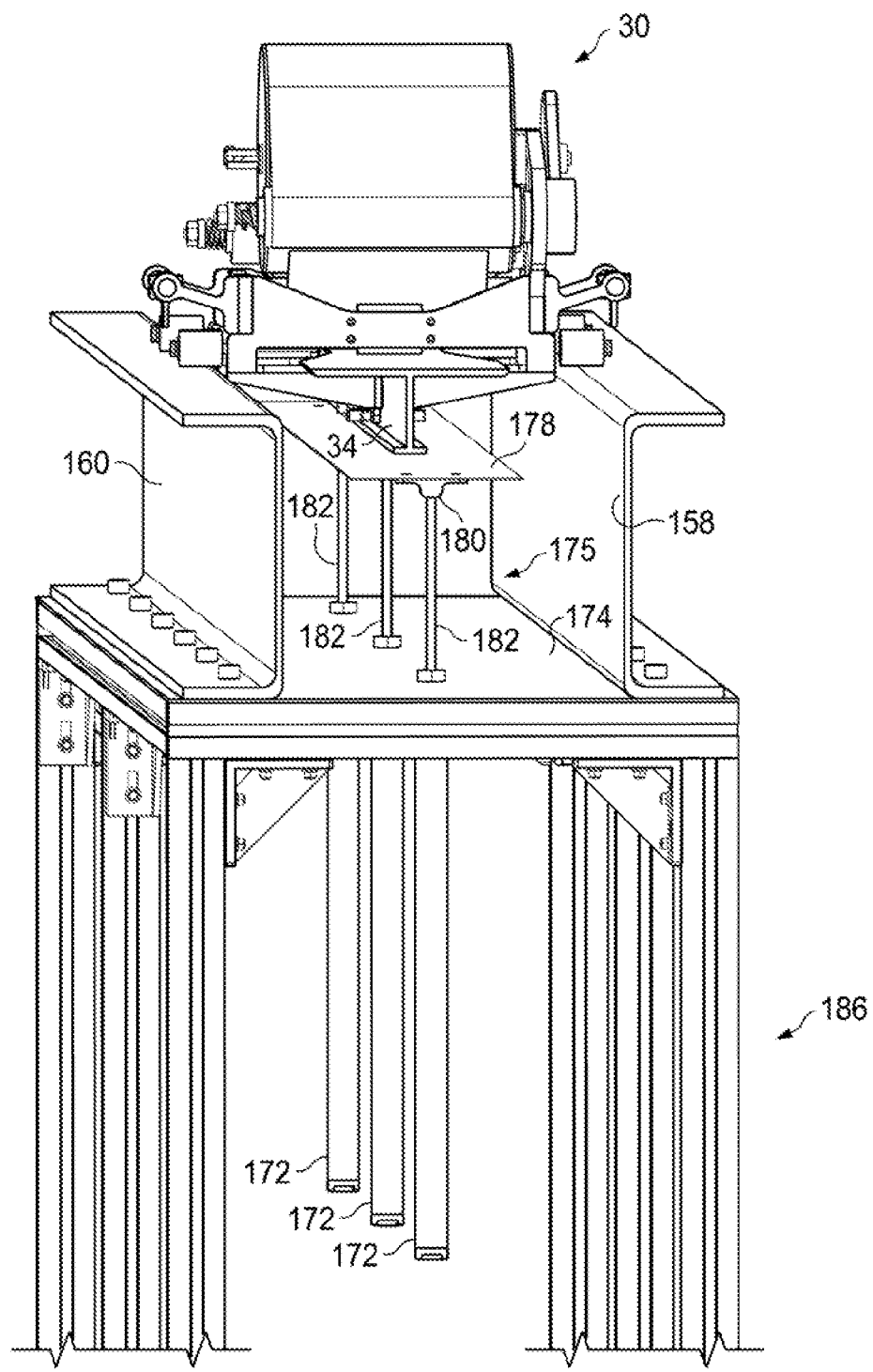
FIG. 30 is an upper perspective showing the stringer support actuators and actuator rods.
Figure 31:
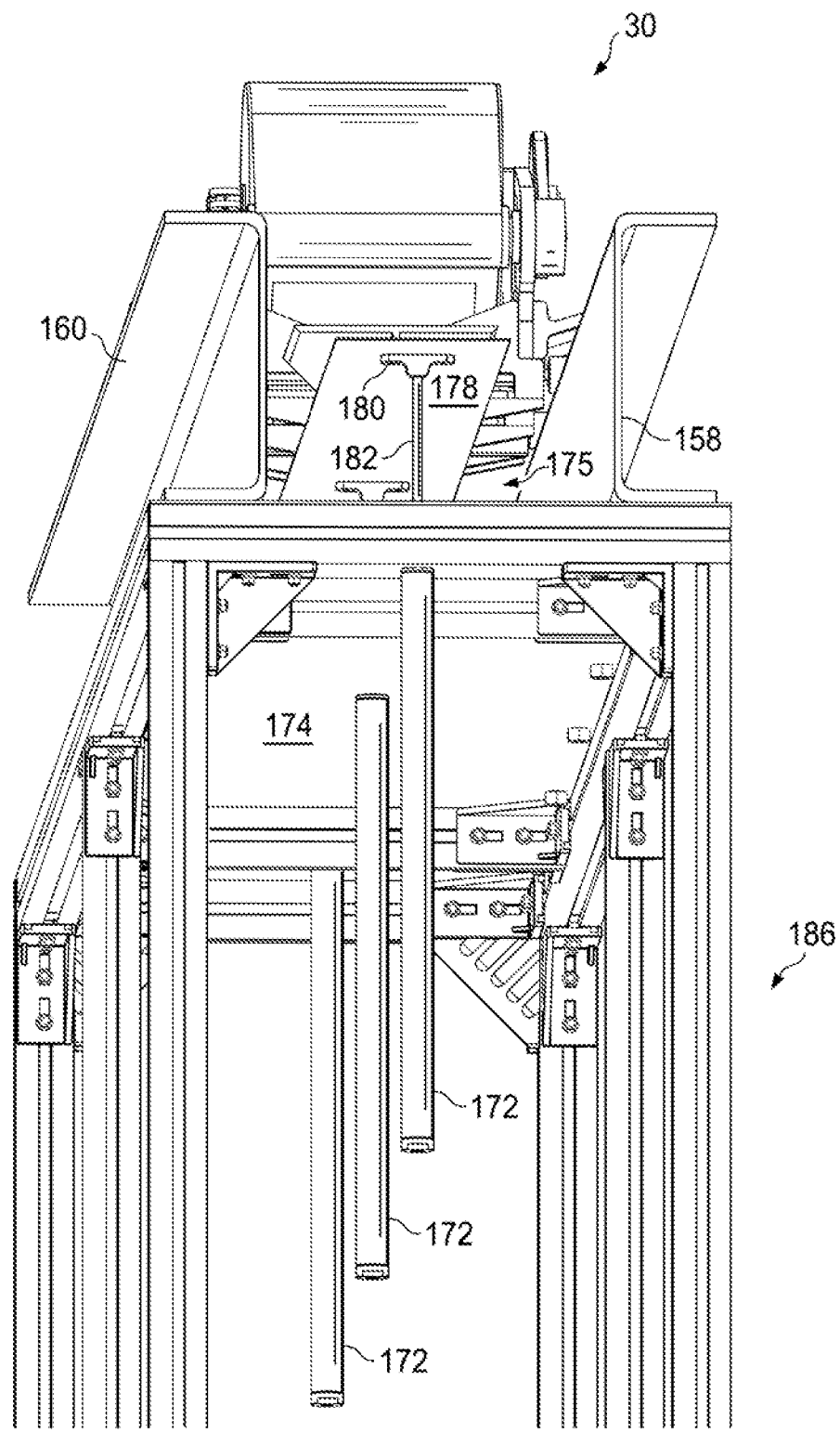
FIG. 31 is an illustration similar to FIG. 30, but from a lower perspective.

Thus, the elongate transfer member 334 of the transfer fixture 304 may function as a surrogate for the elongate member 34 (FIGS. 25 and 26). Further, the upper flanges 324 and webs 328 of beams 320, 322 of the transfer fixture 304 may function as surrogates for the upper flanges 166 (FIG. 28) and webs 162 (FIG. 28) of beams 158, 160 (FIG. 28) of the holding fixture 156 (FIG. 28).

Referring now to FIGS. 25, 28, 35 and 36, to perform a transfer operation, the transfer cart 302 (FIGS. 35 and 36) may be positioned adjacent to the holding system 155 (FIGS. 25 and 28) such that the elongate transfer member 334 of the transfer fixture 304 of the transfer cart 302 is substantially aligned with the elongate member 34 supported in the holding fixture 156 of the holding system 155. With the elongate transfer member 334 aligned with the elongate member 34, the beams 320, 322 of the transfer fixture 304 may also be substantially aligned with the beams 158, 160 of the holding fixture 156. Therefore, the film applicator 30 may be moved (e.g., pulled) from the holding fixture 156 to the transfer fixture 304. As the film applicator 30 is transferred onto the transfer fixture 304, the film applicator 30 may roll along the elongate transfer member 334 and the beams 320, 322.

In an alternative implementation, two transfer carts 302 may be used: one at each end of the holding fixture 156. Both transfer carts 302 may be aligned with the holding system 155. Using two transfer carts 302 may facilitate quickly transferring the film applicator 30 from elongate member 34 to elongate member 34.

Figure 37:
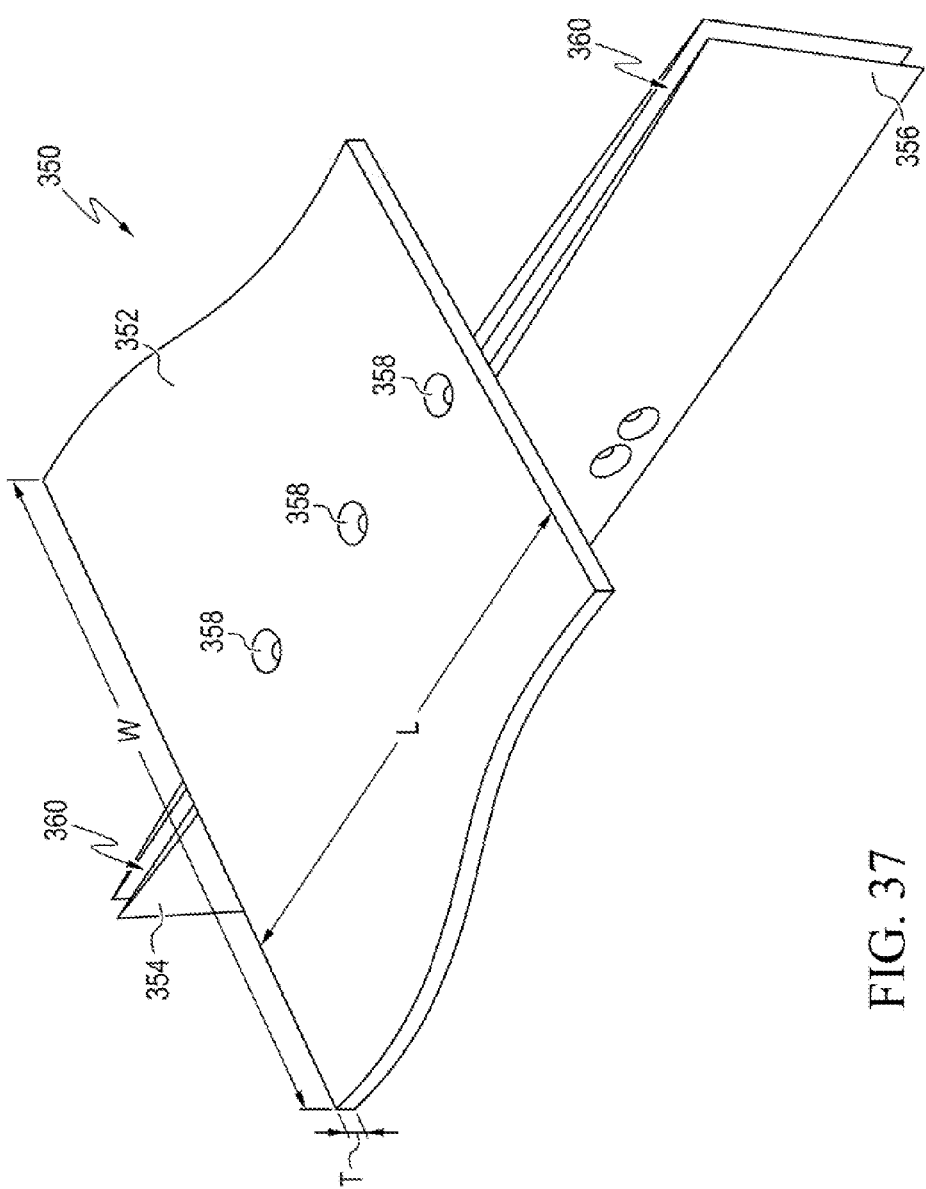
FIG. 37 is a perspective view of the splice member of FIG. 36.
Figure 38:
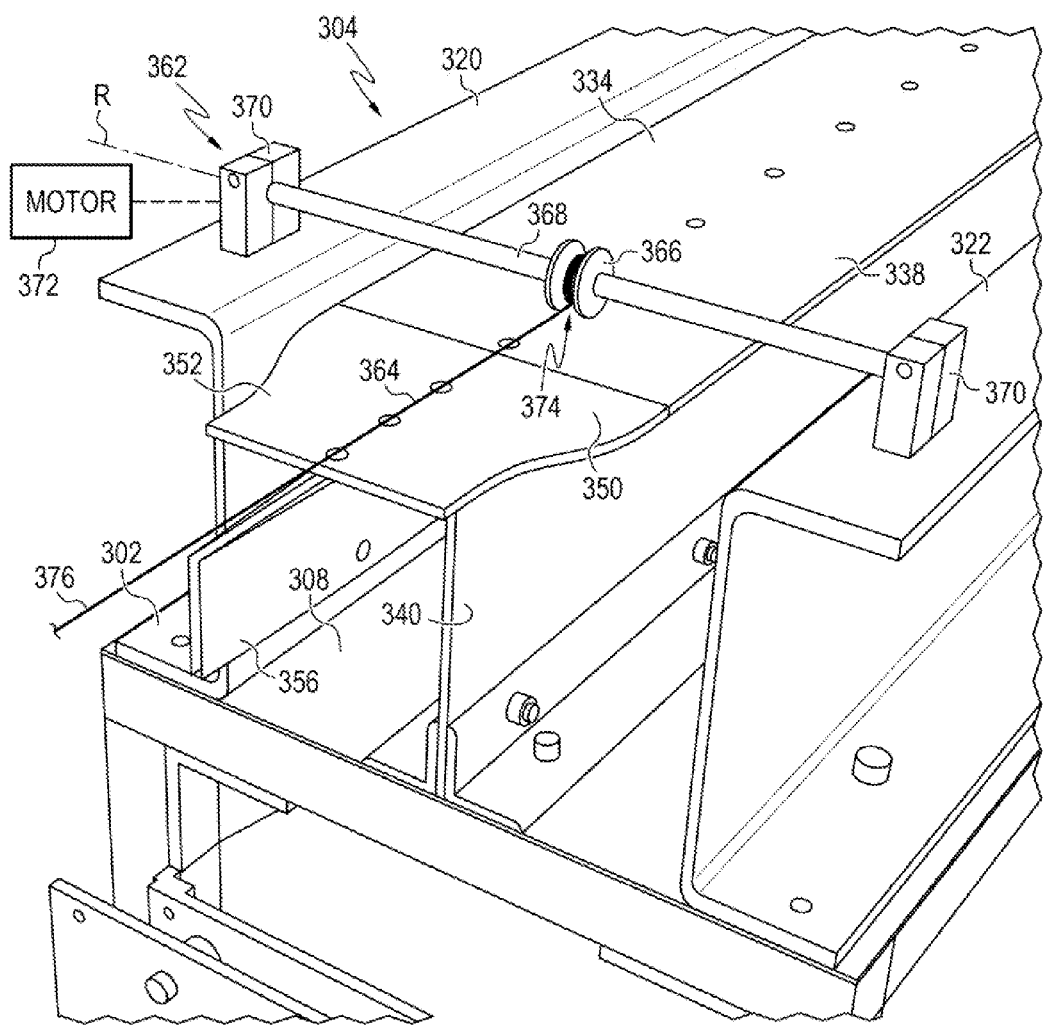
FIG. 38 is a close-up perspective view of a portion of the transfer system of FIG. 36.
Figure 39:
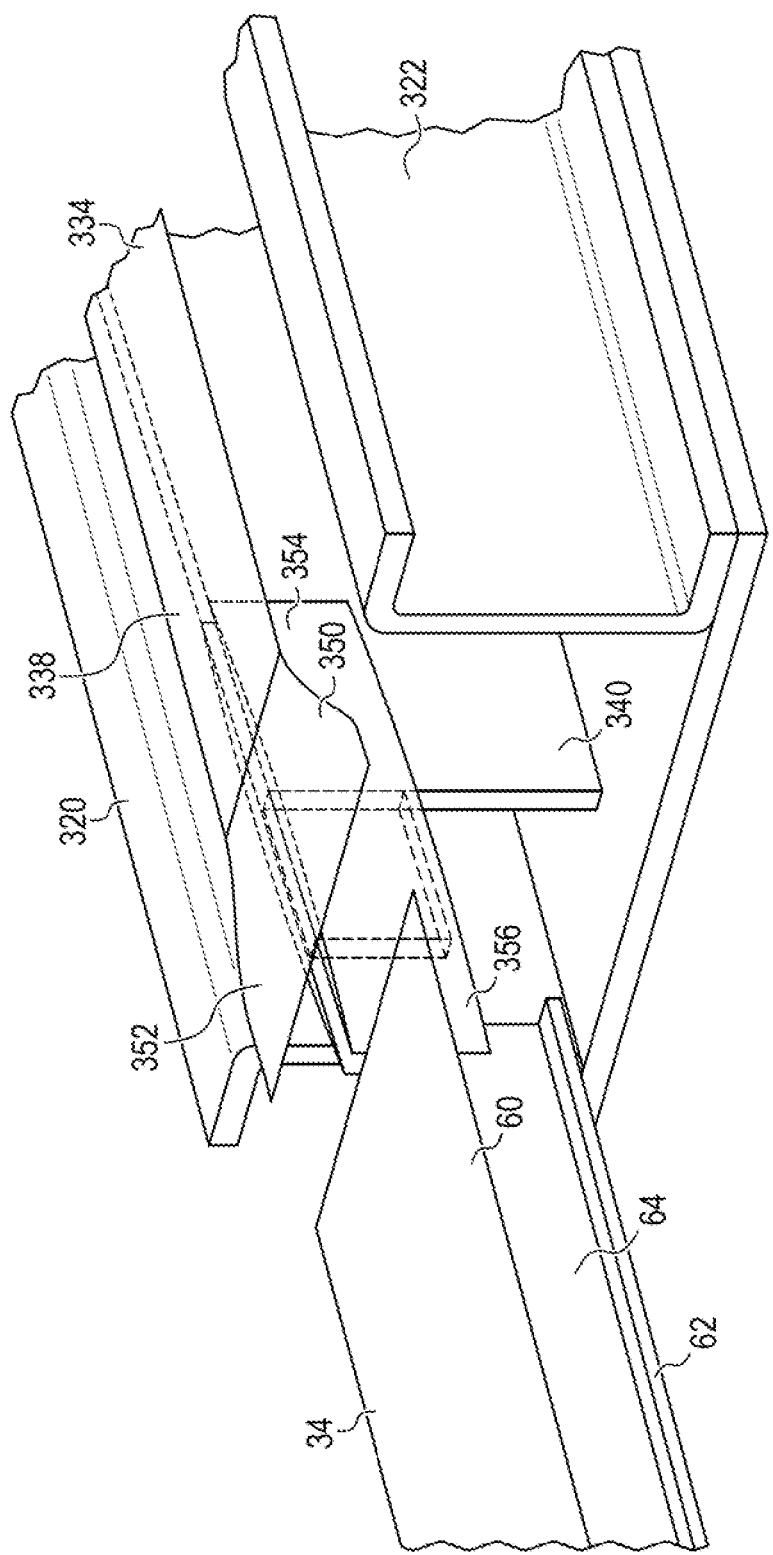
FIG. 39 is a perspective view of an elongate member coupling with the disclosed transfer system.

Referring to FIGS. 37-39, the disclosed transfer system 300 may additionally include a splice member 350. The splice member 350 may be releasably connected to both the elongate transfer member 334 and the elongate member 34 to provide a more continuous transition between the elongate member 34 and the elongate transfer member 334.

The splice member 350 may include a base flange 352, a first web fitting 354, and a second web fitting 356. Mechanical fasteners 358, such as screws or bolts, may secure the base flange 352 to the first and second web fittings 354, 356.

The base flange 352 may have a length L, a width W and a cross-sectional thickness T. The length L, the width W and the cross-sectional thickness T of the base flange 352 may be considerations when designing a splice member 350 for a particular application.

The length L of the base flange 352 may be dictated by the gap between the elongate transfer member 334 and the elongate member 34 when the transfer cart 302 is positioned adjacent to the holding system 155 (FIG. 25). For example, the length L of the base flange 352 may be selected to minimize (if not eliminate) any gap between the elongate transfer member 334 and the elongate member 34, thereby providing a more continuous transition from the elongate member 34 to the elongate transfer member 334.

The width W of the base flange 352 of the splice member 350 may be selected based on the width (or widths) of the base flanges 60, 338 of the elongate member 34 and the elongate transfer member 334, respectively. The width W of the base flange 352 may be substantially constant along the length L of the base flange 352. Alternatively, as shown in the drawings, the width W of the base flange 352 may vary along the length L of the base flange 352, such as when the widths of the elongate member 34 and the elongate transfer member 334 are different.

The cross-sectional thickness T of the base flange 352 of the splice member 350 may be selected based on the cross-sectional thicknesses of the base flanges 60, 338 of the elongate member 34 and the elongate transfer member 334, respectively. Like the width W, the cross-sectional thickness T of the base flange 352 may be substantially constant or may vary along the length L of the base flange 352.

The first and second web fittings 354, 356 of the splice member 350 may be aligned with the length L of the base flange 352. Each web fitting 354, 356 may define a channel 360 (a first channel 360 of the first web fitting 354 and a second channel 360 of the second web fitting 356) for receive an associated web (e.g., web 64 of elongate member 34 or web 340 of elongate transfer member 334) therein. For example, each web fitting 354, 356 may be configured as a "pi fitting."

As shown in FIGS. 38 and 39, the splice member 350 may be coupled to the elongate transfer member 334 such that the web 340 of the elongate transfer member 334 is received in the channel 360 of the first web fitting 354 and the base flange 352 of the splice member 350 is aligned with the base flange 338 of the elongate transfer member 334. The elongate member 34 may be coupled to the splice member 350 such that the web 64 of the elongate member 34 is received in the channel 360 of the second web fitting 356 and the base flange 352 of the splice member 350 is aligned with the base flange 60 of the elongate member 34.

Thus, the splice member 350 may be used to couple the elongate transfer member 334 with the elongate member 34 and to provide a substantially continuous transition between the elongate transfer member 334 and the elongate member 34.

Referring to FIG. 38, the disclosed transfer system 300 may additionally include a pulling system 362 for pulling the film applicator 30 (FIG. 35) along the holding fixture 156 (FIG. 25) and from the holding fixture 156 onto (and off of) the transfer fixture 304 of the transfer cart 302. Therefore, the pulling system 362 may eliminate the need for manually moving (e.g., with the handlebars 98 shown in FIG. 4) the film applicator 30 relative to the elongate member 34 and onto the transfer cart 302.

In one particular implementation, the pulling system 362 may be configured as a winch and may include a cable 364, a spool 366 mounted on a rod 368, mounting brackets 370 and a motor 372. The mounting brackets 370 may be removably connected to the beams 320, 322 of the transfer fixture 304. The rod 368 may be rotatably connected between the mounting brackets 370. The motor 372 may be operatively connected to the rod 368 to effect rotation of the rod 368 about an axis R of rotation. The cable 364 may include a first end 374 connected to the spool 366. The second end 376 of the cable 364 may be releasably connected to the film applicator 30 (FIG. 35), such as with a hook or the like. Upon actuation of the motor 372, the rod 368 may rotate, thereby taking up the cable 364 onto the spool 366 and drawing the film applicator 30 toward the pulling system 362.

Figure 40:
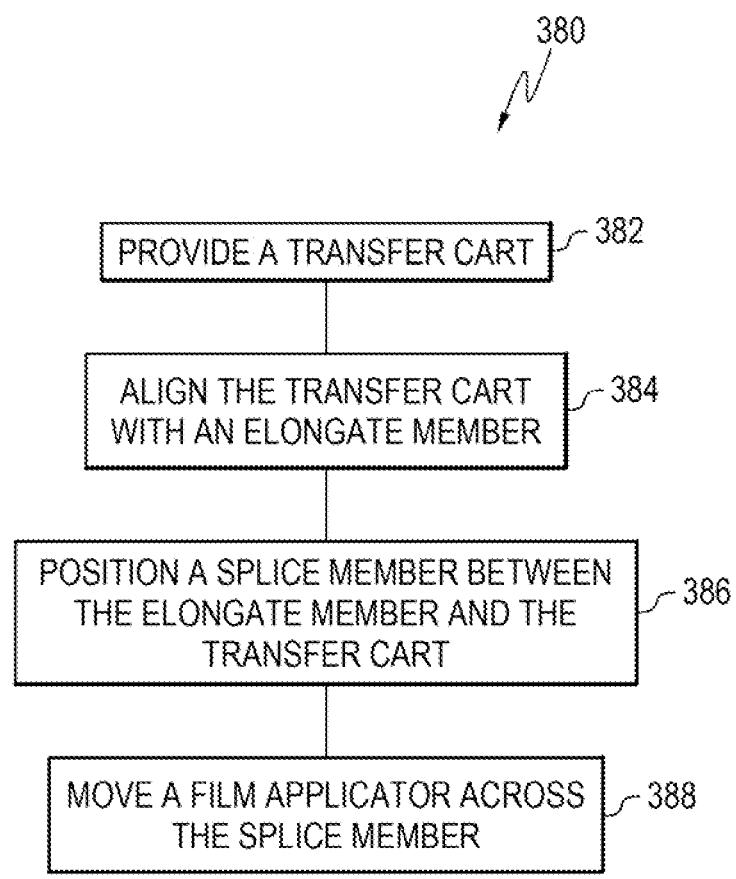
FIG. 40 is a flow chart illustrating one embodiment of the disclosed transfer method.

Referring to FIG. 40, also disclosed is a method 380 for transferring a film applicator relative to an elongate member. For example, the method 380 may be used to transfer a film applicator onto an elongate member and/or to receive a film applicator from an elongate member.

At block 382, the method 380 may begin with the step of providing a transfer cart. The transfer cart may include a transfer fixture that includes elongate beams and an elongate transfer member positioned between the beams.

At block 384, the transfer cart may be aligned with the elongate member. If the elongate member is supported in a holding system, then the transfer cart may also be aligned with the holding system. Specifically, the transfer fixture of the transfer cart may be aligned with the holding fixture of the holding system.

At block 386, a splice member may be positioned between the elongate member and the elongate transfer member of the transfer fixture of the transfer cart. Use of a splice member may provide a more continuous transition between the elongate member and the elongate transfer member.

At block 388, the film applicator may be moved across the transition between the elongate member and the elongate transfer member (e.g., across the splice member). For example, when film application on the elongate member is complete, the film applicator may be moved across the transition from the elongate member to the elongate transfer member. Then, the transfer cart may be moved to another elongate member such that the film applicator may be moved from the elongate transfer member to the second elongate member.

Accordingly, the disclosed transfer system 300 and method 380 may simplify the process of using the disclosed film applicator 30 on an elongate member 34 (e.g., a stringer), particularly when the film applicator 30 is being used in connection with the disclosed holding system 155.

Figure 41:
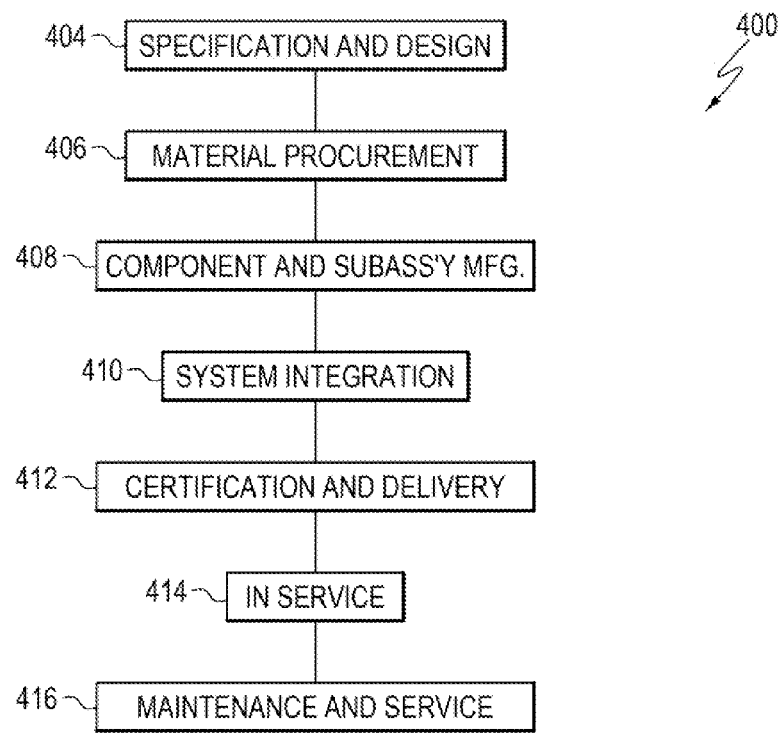
FIG. 41 is a flow diagram of aircraft production and service methodology.
Figure 42:
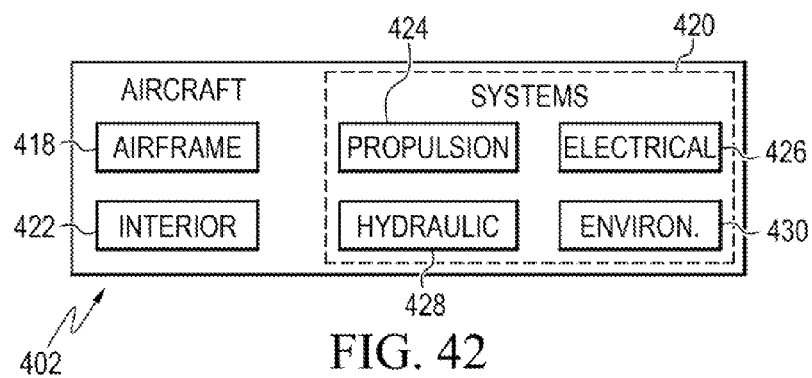
FIG. 42 is a block diagram of an aircraft.

Examples of the disclosure may be described in the context of an aircraft manufacturing and service method 400, as shown in FIG. 41, and an aircraft 402, as shown in FIG. 42. During pre-production, example method 400 may include specification and design 404 of the aircraft 402 and material procurement 406. During production, component and subassembly manufacturing 408 and system integration 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment and the like.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 42, the aircraft 402 produced by example method 400 may include an airframe 418 with a plurality of systems 420 and an interior 422. Examples of high-level systems 420 include one or more of a propulsion system 424, an electrical system 426, a hydraulic system 428, and an environmental system 430. Any number of other systems may be included. Although an aerospace example is shown, the principles of the invention may be applied to other industries, such as the automotive industry.

Apparatus and methods embodied herein may be employed during any one or more of the stages of the production and service method 400. Components or subassemblies corresponding to production process 408 may be fabricated or manufactured using the disclosed transfer system and method. For example, the disclosed transfer system and method may be used to join support structures to the airframe 418. Also, one or more apparatus examples, method examples, or a combination thereof may be utilized during the production stages 408 and 410, for example, by substantially expediting assembly of or reducing the cost of an aircraft 402. Similarly, one or more of apparatus examples, method examples, or a combination thereof may be utilized while the aircraft 402 is in service, for example and without limitation, to maintenance and service 416.

Although various embodiments of the disclosed transfer system and method for applying a film material to an elongate member have been shown and described, modifications may occur to those skilled in the art upon reading the specification. The present application includes such modifications and is limited only by the scope of the claims.

What is claimed is:

1. A transfer system comprising:
    a frame comprising an upper end portion and a lower end portion;
    an ambulation device connected to said lower end portion;
    a transfer fixture connected to said upper end portion, said transfer fixture defining a longitudinal axis and comprising:
        a first beam elongated along said longitudinal axis and comprising a first upper flange defining an elongated first track surface;
        a second beam opposed from said first beam, said second beam being elongated along said longitudinal axis and comprising a second upper flange defining an elongated second track surface, wherein said first beam and said second beam define an elongated channel therebetween; and
        an elongate transfer member positioned in said elongated channel, said elongate transfer member being positionally fixed relative to said first beam and said second beam and comprising a web and a base flange, wherein said web is elongated along said longitudinal axis, and wherein said base flange is fixedly connected to said web and elongated along said longitudinal axis such that said base flange is substantially parallel with said first upper flange and said second upper flange;
    a film applicator in rolling engagement with said base flange of said elongate transfer member, said first track surface of said first beam, and said second track surface of said second beam; and
    a pulling system operatively connecting said film applicator to said transfer fixture.

2. The transfer system of claim 1 wherein said ambulation device comprises a wheel.

3. The transfer system of claim 1 wherein said frame comprises a mounting platform and a plurality of legs connected to said mounting platform, and wherein said transfer fixture is connected to said mounting platform.

4. The transfer system of claim 3 wherein said transfer fixture is integral with said mounting platform.

5. The transfer system of claim 3 comprising a plurality of ambulation devices, wherein each ambulation device of said plurality of ambulation devices is connected to an associated leg of said plurality of legs.

6. The transfer system of claim 1 wherein said elongate transfer member comprises a substantially T-shaped cross-section.

7. The transfer system of claim 1 further comprising a splice member connected to said elongate transfer member.

8. The transfer system of claim 7 wherein said splice member comprises:
    a splice member base flange;
    a first web fitting connected to said splice member base flange; and
    a second web fitting connected to said splice member base flange.

9. The transfer system of claim 8 wherein said first web fitting defines a first channel, and wherein said web of said elongate transfer member is received in said first channel.

10. The transfer system of claim 8 wherein said splice member base flange is substantially aligned with said base flange of said elongate transfer member.

11. The transfer system of claim 8 wherein said second web fitting defines a second channel.

12. The transfer system of claim 1 wherein said pulling system comprises a cable.

13. The transfer system of claim 1 wherein said film applicator comprises a first outrigger wheel in rolling engagement with said transfer fixture.

14. The transfer system of claim 13 wherein said first outrigger wheel is in rolling engagement with said first track surface of said first beam.

15. The transfer system of claim 14 wherein said film applicator comprises a second outrigger wheel.

16. The transfer system of claim 15 wherein said second outrigger wheel is in rolling engagement with said second track surface of said second beam.

17. The transfer system of claim 1 wherein said film applicator comprises a compaction roller bearing against said base flange.

18. The transfer system of claim 1 wherein said film applicator comprises a set of pinch rollers engaged with said elongate transfer member.

19. The transfer system of claim 18 wherein said pinch rollers are engaged with said web of said elongate transfer member.

20. The transfer system of claim 7 wherein said splice member couples said elongate transfer member with a stringer.

21. The transfer system of claim 1 further comprising:
    a holding system comprising a holding fixture, said holding fixture defining a second channel and comprising an elongate support positioned in said second channel; and
    an elongate member received in said holding fixture and supported on said elongate support.

22. The transfer system of claim 21 wherein said elongate transfer member is substantially aligned with said elongate member.

23. The transfer system of claim 21 further comprising a splice member connecting said elongate transfer member with said elongate member.

24. The transfer system of claim 21 wherein said film applicator is moveable between said transfer fixture and said holding fixture.

* * * * *